US011082823B2

(12) United States Patent
Mok et al.

(10) Patent No.: US 11,082,823 B2
(45) Date of Patent: Aug. 3, 2021

(54) APPARATUS AND METHOD FOR GENERATING DYNAMIC GROUP

(71) Applicant: Samsung Electronics Co., Ltd., Suwon-si (KR)

(72) Inventors: Youngjoong Mok, Suwon-si (KR); Sangwook Kwon, Suwon-si (KR); Kyungkyu Kim, Suwon-si (KR); June Hwang, Incheon (KR); Hyun Jeong Kang, Seoul (KR); Jonghyung Kwun, Seoul (KR); Kyuho Han, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 101 days.

(21) Appl. No.: 15/455,747

(22) Filed: Mar. 10, 2017

(65) Prior Publication Data

US 2017/0265018 A1 Sep. 14, 2017

(30) Foreign Application Priority Data

Mar. 10, 2016 (KR) .......................... 10-2016-0028640

(51) Int. Cl.
*H04W 4/00* (2018.01)
*H04W 4/70* (2018.01)
(Continued)

(52) U.S. Cl.
CPC ............. *H04W 4/70* (2018.02); *H04L 67/303* (2013.01); *H04W 4/08* (2013.01); *H04W 4/80* (2018.02);
(Continued)

(58) Field of Classification Search
CPC ....... H04W 4/70; H04W 4/005; H04W 88/02; H04L 67/303
See application file for complete search history.

(56) References Cited

U.S. PATENT DOCUMENTS

2009/0170488 A1* 7/2009 Becker .................... H04W 4/08
455/416
2009/0290522 A1* 11/2009 Zhou ....................... H04W 4/08
370/312

(Continued)

OTHER PUBLICATIONS

3rd Generation Partnership Project; Technical Specification Group Core Network and Terminals; Proximity-services (ProSe) Management Objects (MO) (Release 13), 3GPP TS 24.333, Jun. 2016, pp. 1-121, V13.3.0, 3GPP, Valbonne, France.

(Continued)

*Primary Examiner* — Clemence S Han
(74) *Attorney, Agent, or Firm* — Jefferson IP Law, LLP

(57) ABSTRACT

A fifth generation (5G) or a pre-5G communication system provided to support a higher data transmission rate than a system after a fourth generation (4G) communication system, such as long-term evolution (LTE) is provided. An apparatus of a user equipment (UE) using device-to-device (D2D) communication is provided. The apparatus includes at least one processor, and at least one transceiver configured to be operatively coupled to the at least one processor, wherein the at least one processor is configured to receive a response message from each of a plurality of UEs in response to a request message transmitted from the UE, identify at least one UE for a dynamic group from among the plurality of UEs based on the response message, generate an identifier (ID) for the dynamic group based on an ID of the UE, and transmit, to the at least one UE, a group create message including the ID for the dynamic group.

13 Claims, 26 Drawing Sheets

(51) Int. Cl.
*H04W 8/18* (2009.01)
*H04W 4/80* (2018.01)
*H04W 4/08* (2009.01)
*H04W 4/90* (2018.01)
*H04L 29/08* (2006.01)
*H04W 88/02* (2009.01)

(52) U.S. Cl.
CPC ............. *H04W 4/90* (2018.02); *H04W 8/186* (2013.01); *H04W 88/02* (2013.01)

(56) References Cited

U.S. PATENT DOCUMENTS

| | | | | |
|---|---|---|---|---|
| 2010/0014652 | A1* | 1/2010 | Yasuda | H04M 3/36 379/196 |
| 2014/0003319 | A1* | 1/2014 | Etemad | H04W 28/08 370/312 |
| 2015/0341759 | A1 | 11/2015 | Kerger et al. | |
| 2015/0358804 | A1* | 12/2015 | Fransen | H04W 76/14 370/329 |
| 2016/0212793 | A1* | 7/2016 | Jung | H04W 76/14 |
| 2016/0269185 | A1* | 9/2016 | Stojanovski | H04L 9/3247 |
| 2016/0381523 | A1* | 12/2016 | Baghel | H04W 52/46 370/315 |
| 2016/0381720 | A1* | 12/2016 | Baek | H04W 8/14 370/329 |
| 2017/0064736 | A1* | 3/2017 | Yu | H04W 76/14 |
| 2018/0026803 | A1* | 1/2018 | Fujishiro | H04W 4/06 370/312 |
| 2018/0242118 | A1* | 8/2018 | Belleschi | H04W 4/08 |

OTHER PUBLICATIONS

3rd Generation Partnership Project; Technical Specification Group Radio Access Network; Evolved Universal Terrestrial Radio Access (E-UTRA); Radio Resource Control (RRC); Protocol Specification (Release 14), 3GPP TS 36.331, Sep. 2016, pp. 1-643, V14.0.0, 3GPP, Valbonne, France.

3rd Generation Partnership Project; Technical Specification Group Services and System Aspects; Proximity-based Services (ProSe); Stage 2 (Release 12), 3GPP TS 23.303, Mar. 2016, V12.8.0, 3GPP, Valbonne, France.

3rd Generation Partnership Project; Technical Specification Group Services and System Aspects; Proximity-based Services (ProSe); Stage 2 (Release 14), 3GPP TS 23.303, Dec. 2016, pp. 1-124, V14.1.0, 3GPP, Valbonne, France.

3rd Generation Partnership Project; Technical Specification Group Core Network and Terminals; Proximity-Services (ProSe) User Equipment (UE) to ProSe Function Protocol Aspects; Stage 3 (Release 14), 3GPP TS 24.334, Dec. 2016, pp. 1-261, V14.0.0, 3GPP, Valbonne, France.

* cited by examiner

APPARATUS AND METHOD FOR GENERATING DYNAMIC GROUP

CROSS-REFERENCE TO RELATED APPLICATION(S)

This application claims the benefit under 35 U.S.C. § 119(a) of a Korean patent application filed on Mar. 10, 2016 in the Korean Intellectual Property Office and assigned Serial number 10-2016-0028640, the entire disclosure of which is hereby incorporated by reference.

TECHNICAL FIELD

The present disclosure relates to wireless communication. More particularly, the present disclosure relates to a method and an apparatus for generating a dynamic group in device-to-device (D2D) communication.

BACKGROUND

In order to meet wireless data traffic demands that have increased after $4^{th}$ Generation (4G) communication system commercialization, efforts to develop an improved 5G communication system or a pre-5G communication system have been made. For this reason, the 5G communication system or the pre-5G communication system is called a beyond 4G network communication system or a post long term evolution (LTE) system.

In order to achieve a high data transmission rate, an implementation of the 5G communication system in an mmWave band (e.g., 60 GHz band) is being considered. In the 5G communication system, technologies, such as beam-forming, massive multiple input multiple output (MIMO), full dimensional MIMO (FD-MIMO), array antenna, analog beam-forming, and large scale antenna are discussed to mitigate a propagation path loss in the mmWave band and increase a propagation transmission distance.

Further, the 5G communication system has developed technologies, such as an evolved small cell, an advanced small cell, a cloud radio access network (RAN), an ultra-dense network, device-to-device (D2D) communication, a wireless backhaul, a moving network, cooperative communication, coordinated multi-points (CoMP), and received interference cancellation to improve the system network.

In addition, the 5G system has been developing hybrid frequency shift keying and quadrature amplitude modulation (FQAM) and sliding window superposition coding (SWSC), which is an advanced coding modulation (ACM) scheme, filter bank multi carrier (FBMC), non-orthogonal multiple access (NOMA), and sparse code multiple access (SCMA), which is an advanced access technology.

A D2D communication service has been expanded to provide a fallback for the case in which an upper node, such as a base station or the like, loses its function, and attempts to secure a diversity of a communication link. Therefore, various services have been required for improving the convenience of a user who uses the D2D communication service.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus that create a dynamic group by taking into consideration locations of a plurality of other user equipment (UEs) in device-to-device (D2D) communication.

In accordance with an aspect of the present disclosure, a method of a UE using D2D communication is provided. The method includes receiving, from each of a plurality of UEs, a response message in response to a request message transmitted from the UE, identifying at least one UE for a dynamic group from among the plurality of UEs based on the response message, generating an identifier (ID) for the dynamic group based on an ID of the UE, and transmitting, to the at least one UE, a group create message including the ID for the dynamic group.

In accordance with another aspect of the present disclosure, an apparatus of a UE using D2D communication is provided. The apparatus includes at least one processor, and at least one transceiver configured to be operatively coupled to the at least one processor, wherein the at least one processor is configured to receive a response message from each of a plurality of UEs in response to a request message transmitted from the UE, identify at least one UE for a dynamic group from among the plurality of UEs based on the response message, generate an identifier (ID) for the dynamic group based on an ID of the UE, and transmit, to the at least one UE, a group create message including the ID for the dynamic group.

In accordance with another aspect of the present disclosure, an apparatus of a UE using D2D communication is provided. The apparatus includes at least one processor, and at least one transceiver configured to be operatively coupled to the at least one processor, wherein the at least one processor is configured to transmit a response message of the UE to a master UE in response to receiving a request message from the master UE, and receive, from the master UE, a group create message including an ID for a dynamic group, which is generated based on an ID of the master UE.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
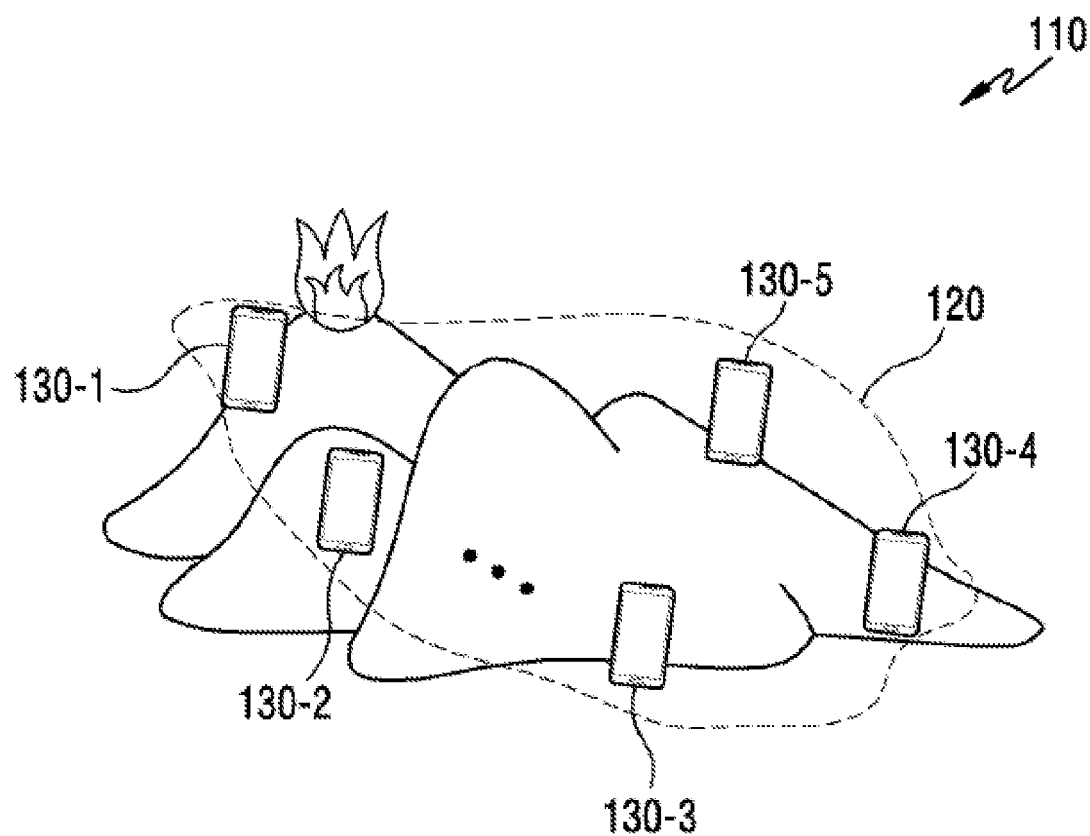
FIG. 1A illustrates a device-to-device (D2D) communication environment which uses a fixed group according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Hereinafter, in various embodiments of the present disclosure, hardware approaches will be described as an example. However, various embodiments of the present disclosure include a technology that uses both hardware and software and thus, the various embodiments of the present disclosure may not exclude the perspective of software.

As communication technologies have developed, demand for a public safety technology in a wireless environment has been increased. The public safety technology may be a technology for supporting a service that protects the security of citizens, a service that reacts to disaster (or emergency situation), or the like. For example, the public safety technology may include a push to talk (PTT) technology. The PTT is a wireless service that uses a terminal just like a walkie-talkie, and a plurality of persons may simultaneously listen to a single person's talk through a terminal.

The development of a communication technology has proposed a device-to-device (D2D) communication technology. The D2D communication is a technology that enables terminals to directly perform communication without using an upper node.

According to some embodiments of the present disclosure, the D2D communication may be used for a groupcast and a unicast among a plurality of user equipment (UEs). For example, the D2D communication may be sidelink direct communication defined in TS 36.331 of the $3^{rd}$ generation partnership project (3GPP). According to another example, the D2D communication may be a Wi-Fi direct technology.

According to some other embodiments of the present disclosure, the D2D communication may be used for directly searching for UEs. For example, the D2D communication may be sidelink direct discovery defined in TS 36.331 of the 3GPP.

To assist the situation in which an upper node, such as a base station, or the like, is not available, the D2D technology may be used in the public safety technology. In addition, to support the PTT service, the D2D technology may be used in the public safety technology.

Among the current D2D communication services, the D2D communication that performs group communication for the public safety technology requests configuring a group in advance. The group may be a higher layer group. For example, the group may be a set of firefighters for D2D communication, a set of police officers for D2D communication, a set of medical workers for D2D communication, and the like.

A UE that uses the current D2D communication may obtain a group identifier (ID) of the group through an operation of initiating the UE, an authentication operation, and the like. In other words, the UE that uses the current D2D communication has no choice but to use a fixed group ID. For example, the UE that uses the D2D communication may store the fixed group ID in read only memory area (e.g., universal subscriber identity module (USIM) and the like) of the UE that uses the D2D communication, and may use the same. As another example, the UE that uses the D2D communication may receive a message (e.g., in the case of 3GPP Release 12, proximity service (ProSe) direct services provisioning management object, or prose public safety direct services provisioning management object including the fixed group ID) including the fixed group ID from a home subscriber server (HSS) in a provisioning operation.

The UE that uses the current D2D communication has no choice but to use the fixed group ID, and thus, the UE is incapable of dynamically generating a new group for a certain purpose. In other words, the UE that uses the current D2D communication only use a fixed group ID, and thus, may be incapable of adaptively coping with an unexpected disaster situation. For example, when an amount of traffic of D2D communication increases due to an unexpected disaster, current UEs that perform D2D communication using the fixed group ID sharing a single communication channel may have problems associated with delay, accessibility, or the like due to collision. As another example, it is difficult to filter the UEs located near the fixed group, and thus, a UE that performs D2D communication through the current fixed group may not be flexible in responding to an incident.

Therefore, the following descriptions provide a method and an apparatus for generating a dynamic group in D2D communication. In addition, the following descriptions provide a group ID for generating and using the dynamic group.

FIG. 1A illustrates a D2D communication environment that uses a fixed group according to an embodiment of the present disclosure.

Referring to FIG. 1A, a communication environment 110 may include a UE 130-1, a UE 130-2, a UE 130-3, a UE 130-4, and a UE 130-5.

Each of the UEs 130-1 to 130-5 may be a device having mobility. For example, each of the UEs 130-1 to 130-5 may be a mobile phone, a smart phone, a music player, a portable game console, a navigation system, a laptop computer, and the like. Each of the UEs 130-1 to 130-5 may be referred to as a mobile station, a terminal, or the like.

The UEs 130-1 to 130-5 may be a device for a public safety service. For example, the UEs 130-1 to 130-5 may be devices that firefighters use for a public safety service. As another example, the UEs 130-1 to 130-5 may be devices that police officers use for a public safety service.

Each of the UEs 130-1 to 130-5 may use D2D communication. For example, each of the UEs 130-1 to 130-5 may transmit/receive data to/from at least one other UE through D2D communication.

The UEs 130-1 to 130-5 may be included in a single fixed group 120 for D2D communication. In other words, each of the UEs 130-1 to 130-5 may be a member of the single fixed group 120 for D2D communication. The UEs 130-1 to 130-5 are included in the single fixed group 120, and thus, the UEs 130-1 to 130-5 may store only a fixed group ID, which is not changeable. Therefore, each of the UEs 130-1 to 130-5 may perform D2D communication only through the fixed group ID.

Figure 1B:
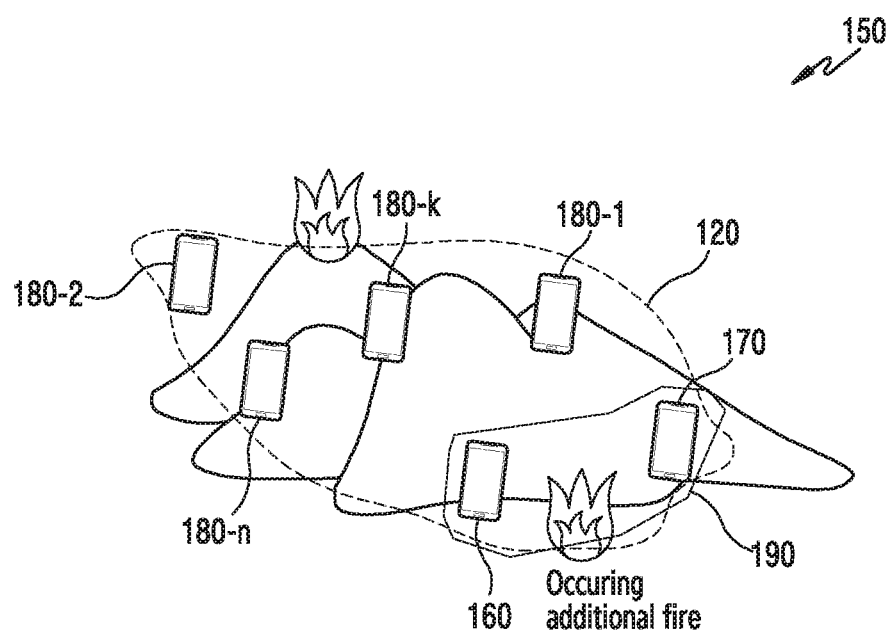
FIG. 1B illustrates a D2D communication environment which uses a dynamic group according to an embodiment of the present disclosure.

FIG. 1B illustrates a D2D communication environment that uses a dynamic group according to an embodiment of the present disclosure.

Referring to FIG. 1B, a communication environment 150 may include a UE 160, a UE 170, a UE 180-1, a UE 180-2, . . . , a UE 180-k, . . . , and a UE 180-n.

Each of the UE 160, the UE 170, and the UEs 180-1 to 180-n may be a device having mobility. For example, each of the UEs 160, 170, and 180-1 to 180-n may be a mobile phone, a smart phone, a music player, a portable game console, a navigation system, a laptop computer, and the like. Each of the UE 160, the UE 170, and the UEs 180-1 to 180-n may be referred to as a mobile station, a terminal, and the like.

Each of the UE 160, the UE 170, and the UEs 180-1 to 180-n may be a device for a public safety service. For example, as illustrated in the communication environment 150, the UE 160, the UE 170, and the UEs 180-1 to 180-n may be devices used by firefighters who suppress a fire.

Each of the UE 160, the UE 170, and the UEs 180-1 to 180-n may be included in the fixed group 120. Each of the UE 160, the UE 170, and the UEs 180-1 to 180-n may store a fixed group ID for the fixed group 120. Each of the UE 160, the UE 170, and the UEs 180-1 to 180-n may perform D2D communication with at least one other UE in the fixed group 120 using the fixed group ID.

Each of the UE 160, the UE 170, and the UEs 180-1 to 180-n may create a dynamic group 190. The dynamic group 190 may be a group for a D2D communication service having a lot of diversity. The dynamic group 190 may be a group for assisting the fixed group 120. In addition, the dynamic group 190 may be a group for responding to an unexpected incident. In addition, the dynamic group 190 may be a temporary group. For example, the dynamic group 190 may be a group that is generated for a certain event, and may dissipate after the certain event is terminated. As another example, the dynamic group 190 may be a group that is generated for the certain event, and may dissipate when another event is generated. As another example, the dynamic group 190 may be a group that is generated for a certain event, and may dissipate when a designated period of time elapses. As another example, the dynamic group 190 may be a group of UEs within a certain distance from a certain UE.

In the communication environment 150, the UE 160 or the UE 170 may create the dynamic group 190 in response to another outbreak of fire. The UE 160 or the UE 170 may generate a dynamic group ID for the dynamic group 190. The UE 160 or the UE 170 may perform D2D communication with at least one other UE in the dynamic group 190 using the dynamic group ID.

The UE 160 or the UE 170 may adaptively (or flexibly) cope with an unexpected situation (e.g., another outbreak of fire in the communication environment 150) through the dynamic group 190.

The following descriptions provide an apparatus of a UE that performs D2D communication through a dynamic group, and a method of the UE. A UE that creates the dynamic group may generate a dynamic group ID for the dynamic group. In addition, at least one other UE included in the dynamic group and the UE that creates the dynamic group may perform D2D communication with each other using the dynamic group ID. The at least one other UE and the UE may flexibly cope with an unexpected situation through the dynamic group-based D2D communication. In addition, the at least one other UE and the UE may increase user experience (UX) through the dynamic group-based D2D communication. In addition, the at least one other UE and the UE may efficiently cope with a disaster situation by performing filtering through the dynamic group.

Figure 2:
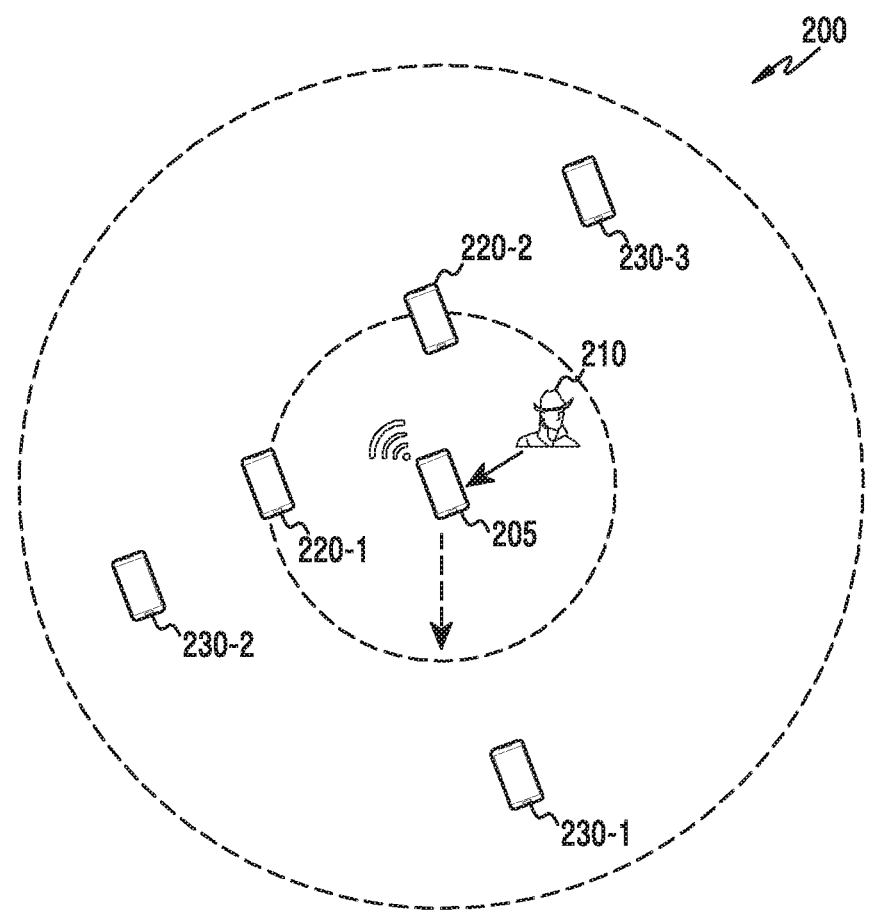
FIG. 2 illustrates a D2D communication environment which creates a dynamic group according to an embodiment of the present disclosure.

FIG. 2 illustrates a D2D communication environment which creates a dynamic group according to an embodiment of the present disclosure.

Referring to FIG. 2, a communication environment 200 may include a UE 205, a UE 220-1, a UE 220-2, a UE 230-1, a UE 230-2, and a UE 230-3.

For example, the UE 205, the UE 220-1, the UE 220-2, the UE 230-1, the UE 230-2, and the UE 230-3 may be UEs carried by police officers. The UE 205, the UE 220-1, the UE 220-2, the UE 230-1, the UE 230-2, and the UE 230-3 may be UEs included in a fixed group. In other words, each of the UE 205, the UE 220-1, the UE 220-2, the UE 230-1, the UE 230-2, and the UE 230-3 may be a UE that performs D2D communication through the fixed group ID. In case of need, each of the UE 205, the UE 220-1, the UE 220-2, the UE 230-1, the UE 230-2, and the UE 230-3 may create a dynamic group. In other words, each of the UE 205, the UE 220-1, the UE 220-2, the UE 230-1, the UE 230-2, and the UE 230-3 may perform D2D communication with at least one other UE in the dynamic group, through the dynamic group ID.

For example, the UE 205 may be a UE carried by a police officer who chases a criminal 210. To chase the criminal 210, the police officer who carries the UE 205 may request support from other police officers nearby who can chase the criminal 210 (e.g., police officers who carry the UE 220-1, the UE 220-2, the UE 230-1, the UE 230-2, and the UE 230-3). In other words, to chase the criminal 210, the UE 205 may be a UE that is requested to create the dynamic group with some of the UE 220-1, the UE 220-2, the UE 230-1, the UE 230-2, and the UE 230-3.

To create the dynamic group, the UE 205 may transmit a request message to the UE 220-1, the UE 220-2, the UE 230-1, the UE 230-2, and the UE 230-3. The request message may be a message for generating the dynamic group. According to some embodiments of the present disclosure, the request message may perform a function for generating the dynamic group and other functions. For example, the request message may include information that requests neighbor UEs to chase the criminal 210 in addition to information for generating the dynamic group. As another example, the request message may include information for identifying a distance between each of the neighboring UEs and the UE 205. The transmitted request message may be received by all or some of the UE 220-1, the UE 220-2, the UE 230-1, the UE 230-2, and the UE 230-3.

Each UE that receives the request message from among the UE 220-1, the UE 220-2, the UE 230-1, the UE 230-2, and the UE 230-3 may transmit a response message to the UE 205. The UE 205 may receive the response message. The response message may be a message used when the UE 205 identifies at least one UE for the dynamic group. According to some embodiments of the present disclosure, the response message may perform a function for identifying at least one UE for the dynamic group, and other functions. For example, the response message may include information for identifying at least one UE, state information of police officers who carry the UEs that receive the request message, distance information associated with a distance between each of the UEs that receive the request message and the UE 205, and the like.

The UE 205 that receives the response message may identify at least one UE for the dynamic group based on the response message. For example, the UE 205 may identify the UE 220-1 and the UE 220-2, which are located close to the UE 205, as UEs for the dynamic group based on the response message.

The UE 205 may transmit a group create message including the dynamic group ID for the dynamic group to each of the identified UE 220-1 and the identified UE 220-2. The group create message may be a notification message for reporting the dynamic group ID in order to generate a group with the identified UE 220-1 and the identified UE 220-2. According to some embodiments of the present disclosure, the group create message may perform other functions, in addition to generating a dynamic group. For example, the group create message may include state information of a police officer who carries the UE 205, updated state information of the criminal 210, and the like, in addition to information associated with the dynamic group ID.

Through the above described operation procedure, the UE 205 may create a dynamic group with the UE 220-1 and the UE 220-2. The UE 205 may perform D2D communication with the UE 220-1 and the UE 220-2 using the dynamic group ID through a channel for the dynamic group. For example, the UE 205 may share, with the UE 220-1 and the UE 220-2 in the dynamic group through the dynamic group, information associated with the direction in which the criminal 210 runs away, information associated with whether the criminal 210 has a lethal weapon, and the like.

Through the dynamic group, the UE 205 may secure a larger number of opportunities for use. Through the dynamic group, the UE 205 may perform D2D communication with UEs that are meaningful to the UE 205 without a separate filtering operation. Through the dynamic group, the UE 205 may flexibly respond to a rapidly changing situation and an unexpected situation.

Figure 3:
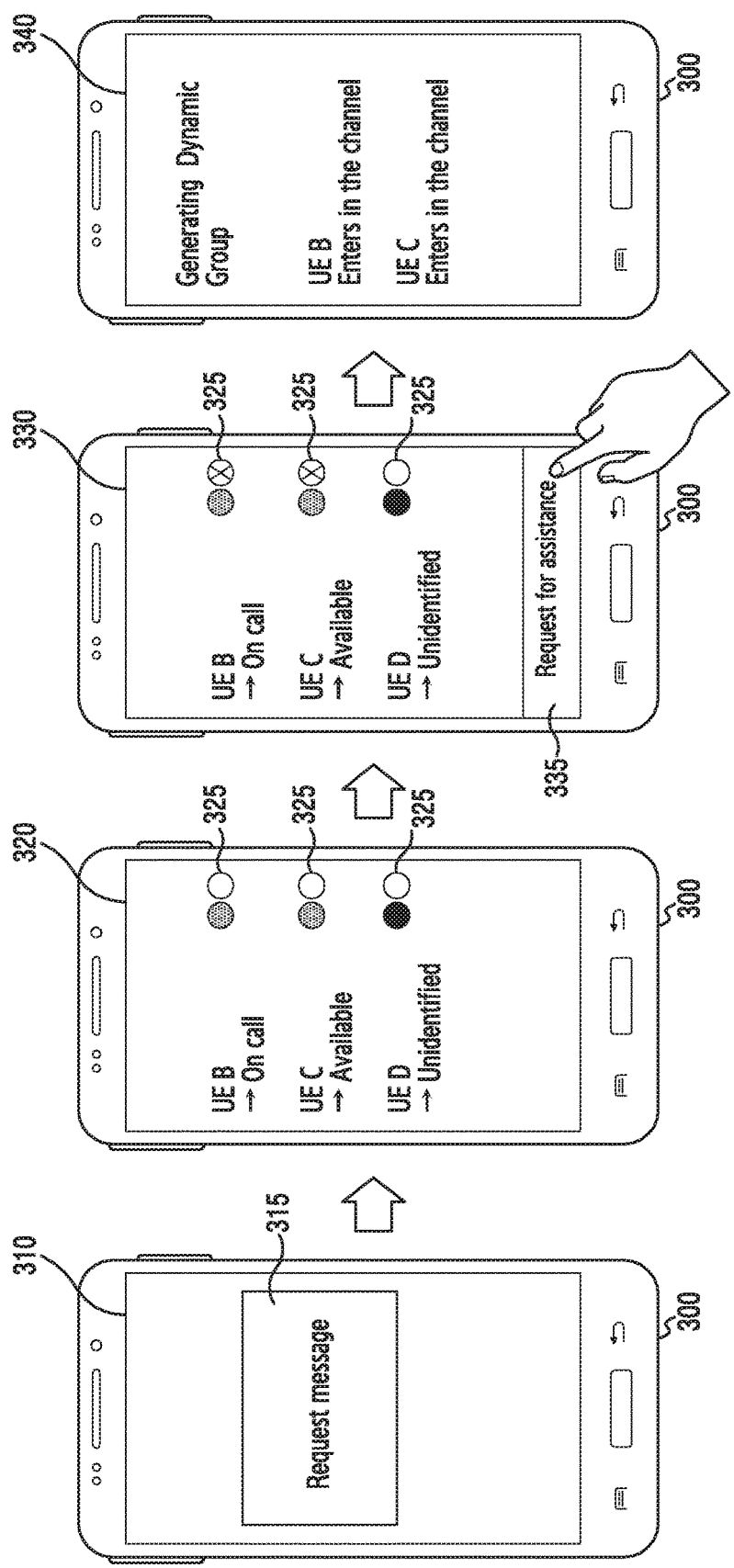
FIG. 3 illustrates a user interface (UI) of a user equipment (UE) that creates a dynamic group according to an embodiment of the present disclosure.

FIG. 3 illustrates a user interface (UI) of a UE that creates a dynamic group according to an embodiment of the present disclosure.

Referring to FIG. 3, a UE 300 may be a UE that desires to create a dynamic group with some of neighboring UEs. The UE 300 may be a UE that desires to create a dynamic group, which is different from a fixed group, to adaptively respond to the situation around the UE 300 or for the efficiency of D2D communication.

The UE 300 may display a UI 310 to transmit a request message to unspecified neighboring UEs. The UI 310 may include an object 315 to transmit the request message. The object 315 may be an icon for a user of the UE 300. The user of the UE 300 may provide, through the object, an input for transmitting the request message by the UE 300 to the unspecified neighboring UEs. In response to the input from the user with respect to the object 315, the UE 300 may transmit or broadcast the request message to the unspecified neighboring UEs.

The unspecified neighboring UEs that receive the request message may transmit a response message in response to the request message. The UE 300 may receive the response message. According to some embodiments of the present disclosure, the response message may be a message only for the UE 300. According to some other embodiments of the present disclosure, the response message may be a broadcasting message.

The UE 300 that receives the response message may display a UI 320 based on the response message. The UI 320 may display information indicating that UE B is currently on call, information indicating that UE C is currently available, and information indicating UE D is currently in an unidentified state. For example, the information indicating that UE B is currently on call may be displayed in the UI 320 based on an ID of the UE B and state information associated with the UE B included in the response message. As another example, the information indicating that UE C is currently available may be displayed in the UI 320 based on an ID of the UE C and state information associated with the UE C included in the response message. The information indicating that the UE D is currently in an unidentified state may be displayed based on ID information of the UE D and state information associated with the UE D included in the response message, or may be displayed when a signal of the UE D is not received.

The user of the UE 300 may recognize that the generation of a dynamic group with the UE B and the UE C is allowed, through the UI 320. To create the dynamic group with the UE B and the UE C, the user of the UE 300 may touch an object 325 for identifying at least one UE for the dynamic group, as shown in an UI 330. In other words, in response to an input on the object 325, provided by the user, the UE 300 may identify the UE B and the UE C for the dynamic group.

The user of the UE 300 may touch an object 335 displayed on the UI 330, for transmitting the group create message. The group create message may perform other functions in addition to a function for reporting the dynamic group ID to the identified UEs. For example, the group create message may perform a function of requesting assistance from the UE B and the UE C, in addition to a function of transmitting the dynamic group ID to the identified UE B and the identified UE C. In response to an input on the object 335, provided by the user, the UE 300 may transmit the group create message to the identified UE B and the identified UE C.

When the UE B and the UE C receive the group create message, the creation of the dynamic group is completed. Through an acknowledgement message or the like, which is transmitted in response to the operation in which the UE B and the UE C receive the group create message, the UE 300 may determine whether the UE B and the UE C receive the group create message. When the creation of the dynamic group is completed, the UE 300 may display a UI 340 for the generated dynamic group. The user of the UE 300 may perform D2D communication with UE B and UE C using the dynamic group ID through the displayed UI 340.

According to some embodiments of the present disclosure, when the UE determines the state of the UE, the UE 300 may actively provide a message (request for assistance) to a communicable UE (e.g., UE B and UE C), without an input on the object 325 provided by the user.

Figure 4:
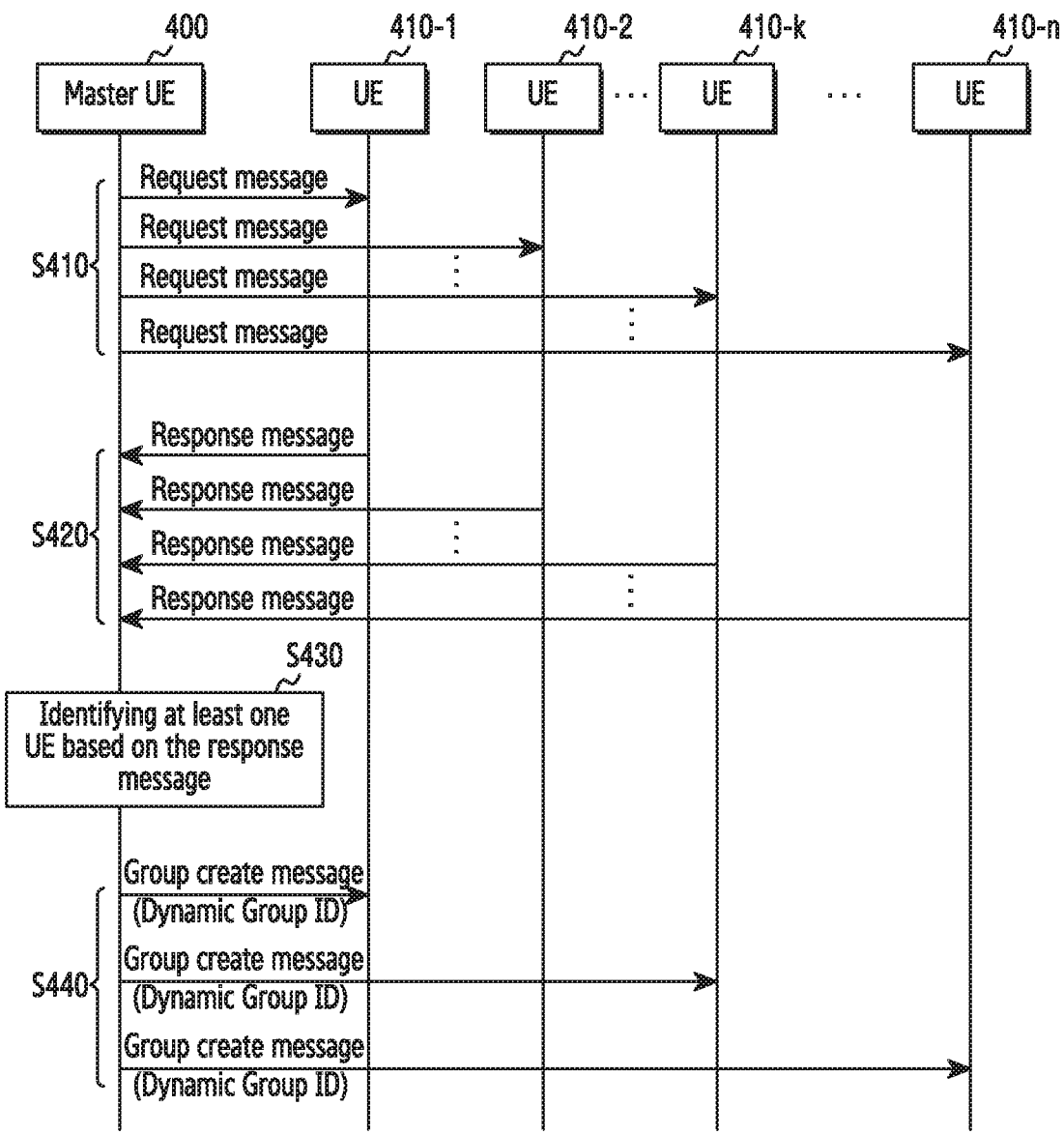
FIG. 4 illustrates a signal flow among UEs that create a dynamic group according to an embodiment of the present disclosure.

FIG. 4 illustrates a signal flow among UEs that create a dynamic group according to an embodiment of the present disclosure.

Referring to FIG. 4, a master UE 400 may broadcast a request message to neighboring UEs (e.g., UEs 410-1 to 410-*n*) in operation S410. The master UE 400 may be a UE that desires creation of the dynamic group. The request message may include information for identifying the master UE 400. For example, the request message may include a source ID of the master UE 400. As another example, the request message may include a Prose UE ID of the master UE 400. The Prose UE ID may be an identifier defined in Release 12 of the 3GPP. As another example, the request message may include a fixed group ID of a fixed group where the master UE 400 belongs.

According to some embodiments of the present disclosure, the master UE 400 may broadcast the request message to unspecified UEs at a specific power through D2D communication. In this instance, the master UE 400 may control a range of transmission of the request message by controlling the magnitude of the specific power. For example, when the master UE 400 desires to form a dynamic group with neighboring UEs included in a relatively large range, the master UE 400 may determine the specific power to be relatively higher. The master UE 400 may broadcast the request message through D2D communication at the determined power.

As another example, when the master UE 400 is in a situation that requires promptitude, the master UE 400 may determine the specific power to be relatively lower, so that the request message arrives at only an adjacent UE for a quick request for assistance. The master UE 400 may broadcast the request message through D2D communication at the determined power.

According to some other embodiments of the present disclosure, the master UE 400 may recognize information associated with neighboring UEs in advance, through another communication procedure (e.g., a cellular communication procedure), or the like. In this instance, the master UE 400 may specify UEs of which information is recognized by the master UE 400, and may transmit the request message through D2D communication.

According to some other embodiments of the present disclosure, the master UE 400 may transmit the request message including an ID of another fixed group where the master UE 400 does not belong. For example, when a police officer who carries the master UE 400 requests assistance from a firefighter, a medical worker, or the like, the master UE 400 may change the group ID to that of the firefighter or the medical worker, and may transmit the request message. In this instance, the master UE 400 may insert the ID of the other fixed group into the request message to enable UEs which receive the request message to recognize the same.

In operation S420, each of the UEs 410-1 to 410-*n*, which receive the request message, transmits the response message to the master UE 400. The response message may include information for identifying each of the UEs 410-1 to the UE 410-*n*. The master UE 400 may receive the response message. The response message may include information for identifying each of the UEs 410-1 to 410-*n*, and thus, the master UE 400 may identify a main agent that transmits the response message. According to some embodiments of the present disclosure, each of the UEs 410-1 to 410-*n* may transmit the response message including state information associated with each of the UEs 410-1 to 410-*n*. For example, the state information may include state information of a user who carries a UE that transmits the response message, battery state information of a UE that transmits the response message, information associated with a timing when the response message is transmitted by the UE that transmits the response message.

In operation S430, the master UE 400 identifies at least one UE for the dynamic group based on the response message. For example, the master UE 400 may identify a main agent that transmits the response message based on an ID of the UE that transmits the response message, which is included in the response message, and may estimate the distance between the master UE 400 and the UE that transmits the response message based on a timing of a reception of the response message. As another example, when state information associated with the UE that transmits the response message is included in the response message, the master UE 400 may identify at least one UE for the dynamic group by taking into consideration an ID of the UE that transmits the response message and the state information.

In operation S440, the master UE 400 transmits the group create message to the at least one identified UE. The master UE 400 may transmit, to the at least one identified UE, the group create message including the ID of the dynamic group. For example, the master UE 400 may transmit the group create message to the identified UEs 410-1, 410-k, and 410-n.

According to some embodiments of the present disclosure, the group create message may be a message for notifying that the at least one identified UE is included in the dynamic group. According to some embodiments of the present disclosure, the group create message may be a message for requesting the at least one identified UE to belong to the dynamic group. In this instance, all or some of the at least one UE may transmit, to the master UE 400, a message for approving of belonging to the dynamic group. In this instance, the dynamic group may be created when the master UE 400 receives a message for approving of belonging to the dynamic group. According to some other embodiments of the present disclosure, the group create message may include other information in addition to an ID of the dynamic group. For example, the other information may be information that a user who carries the master UE 400 desires to transfer to at least one user who carries the at least one identified UE. As another example, the other information may be data to be transmitted to the at least one UE.

Through the signal flow illustrated in FIG. 4, the master UE 400, the UE 410-1, the UE 410-k, and the UE 410-n may be included in the dynamic group. Based on a channel corresponding to the dynamic group, the master UE 400, the UE 410-1, the UE 410-k, and the UE 410-n included in the dynamic group may transmit and receive a message through D2D communication. When compared with a fixed group, the dynamic group includes a smaller number of UEs, and thus, the UEs included in the dynamic group may have a larger number of opportunities for use.

The request message, the response message, and the group create message illustrated in FIG. 4 may be transmitted or received through another node in some embodiments. For example, the response message that the UEs 410-1 to 410-n transmit may be provided to the master UE 400 through an upper node. As another example, the response message may be a message transmitted by another node having information associated with the UEs 410-1 to 410-n.

Figure 5A:
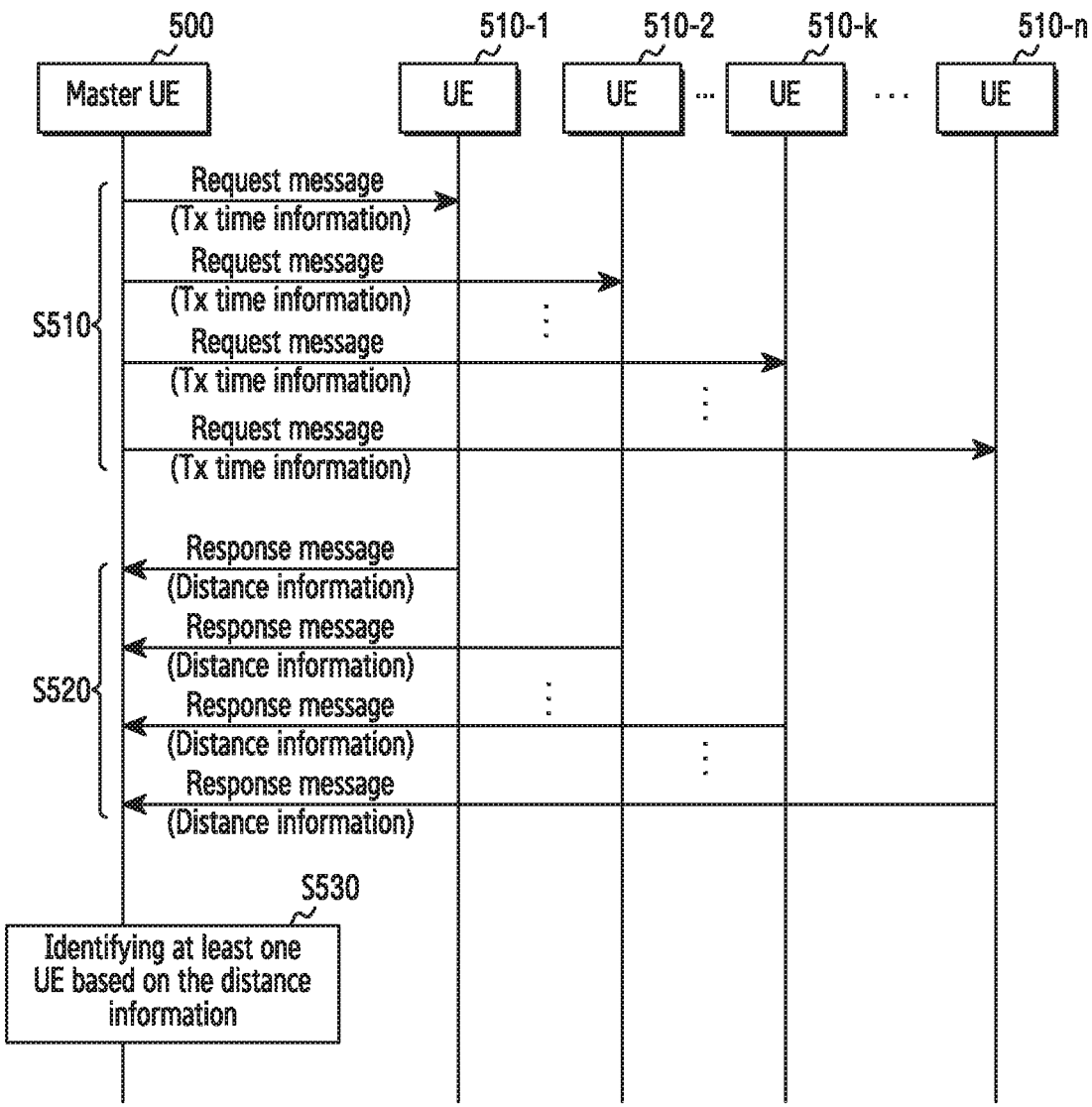
FIG. 5A illustrates a signal flow among UEs for identifying at least one UE for a dynamic group according to an embodiment of the present disclosure.

FIG. 5A illustrates a signal flow among UEs, for identifying at least one UE for a dynamic group according to an embodiment of the present disclosure.

Referring to FIG. 5A, a master UE 500 transmits a request message to neighboring UEs (e.g., UEs 510-1 to 510-n) in operation S510. The master UE 500 may transmit, to the UEs 510-1 to 510-n, the request message including transmission time information (transmit (Tx) time information) of the request message. The transmission time information may be information used when each of the UEs 510-1 to 510-n that receives the request message calculates the distance between the master UE 500 and a corresponding UE.

In operation S520, each of the UEs 510-1 to 510-n transmits a response message to the master UE 500 in response to the request message. The response message may include distance information between each of the UEs 510-1 to the UE 510-n and the master UE 500. The distance information may be an example of information required when the master UE 500 identifies at least one UE for a dynamic group from among the UEs 510-1 to 510-n. According to some embodiments of the present disclosure, UEs 510-1 to 510-n may transmit the response message including reception time information of the request message. In this instance, the master UE 500 may determine the distance information based on the transmission time information of the request message and the reception time information of the received request message.

In operation S530, the master UE 500 identifies at least one UE for the dynamic group based on the distance information included in the response message. For example, the master UE 500 may compare a value obtained based on the distance information and a designated value. When the value obtained through the distance information is less than the designated value (e.g., when a distance is closer than a designated distance), the master UE 500 may identify a UE that transmits the response message including the distance information as a UE for the dynamic group.

Figure 5B:
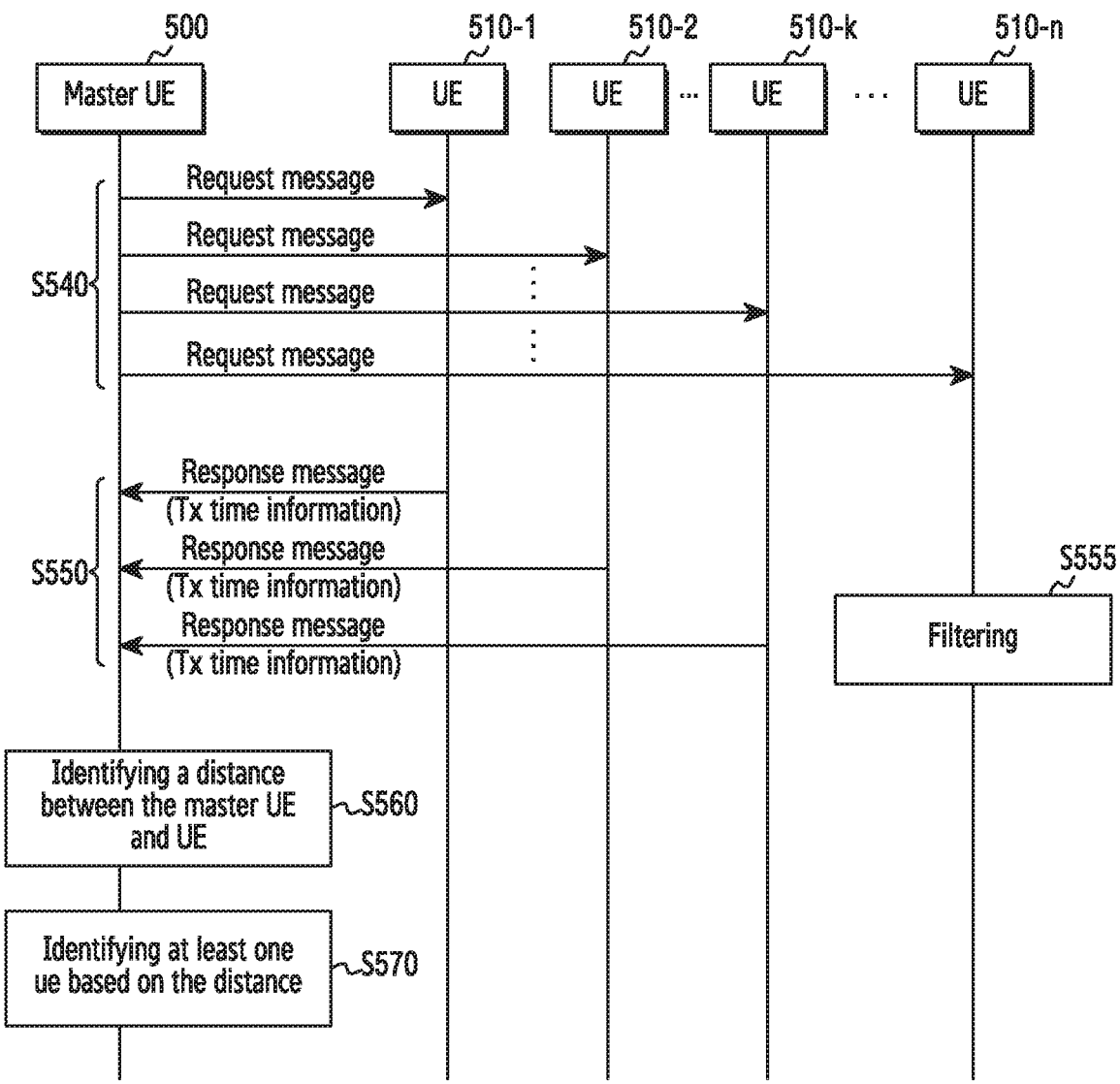
FIG. 5B illustrates a signal flow among UEs for identifying at least one UE for a dynamic group according to an embodiment of the present disclosure.

FIG. 5B illustrates a signal flow among UEs, for identifying at least one UE for a dynamic group according to an embodiment of the present disclosure.

Referring to FIG. 5B, the master UE 500 transmits a request message to neighboring UEs (e.g., UEs 510-1 to 510-n) in operation S540. According to some embodiments of the present disclosure, the master UE 500 may transmit, to the UE 510-1 to 510-n, the request message including information for requesting transmission time information of a response message to be included in the response message.

In operation S550, some of the UEs 510-1 to 510-n that receive the request message respectively transmit the response message including transmission time information (Tx time information) of the response message to the master UE 500. The transmission time information of the response message may be information used when the master UE 500 determines the distance between the master UE 500 and a UE that transmits the response message.

In operation S555, the UE 510-n does not transmit the response message to the master UE 500, and filters out the request message. The filtering operation of the UE 510-n may be an operation that the UE 510-n performs to avoid belonging to the dynamic group. For example, when a user who carries the UE 510-n has a task required to be quickly done, the UE 510-n implicitly reports to the master UE 500 that the UE 510-n is incapable of belonging to the dynamic group, through performing operation S555. As another example, when a battery state of the UE 510-n is difficult to perform D2D communication, the UE 510-n may implicitly report that the UE 510-n is incapable of belonging to the dynamic group, through performing operation S555. According to some embodiments of the present disclosure, the UE 510-n may transmit, to the master UE 500, a message indicating that the UE 510-n is incapable of belonging to the dynamic group, instead of performing the filtering operation.

In operation S560, the master UE 500 identifies a distance between the master UE 500 and at least one UE that transmits the response message. More particularly, the master UE 500 may identify the distance between the master UE 500 and at least one UE that transmits the response message based on transmission time information of the response message included in the response message and reception time information of the response message.

In operation S570, the master UE 500 identifies at least one UE for the dynamic group based on the identified distance. For example, when the identified distance is less than a designated value (e.g., when a distance is closer to a designated distance), the master UE 500 may identify the corresponding UE as a UE for the dynamic group.

Referring to FIGS. 5A and 5B, the master UE 500 may identify at least one UE for the dynamic group through a transmission or reception of a message (e.g., the request message or the response message) including the transmission time information or the distance information. The at least one identified UE is a UE obtained through filtering through operations S510 to S570, and thus, the master UE 500 may create a dynamic group with UEs that are substantially meaningful to the master UE 500. The master UE 500 may obtain a larger number of opportunities for use through the dynamic group, and may perform D2D communication in a better communication environment.

Figure 6A:
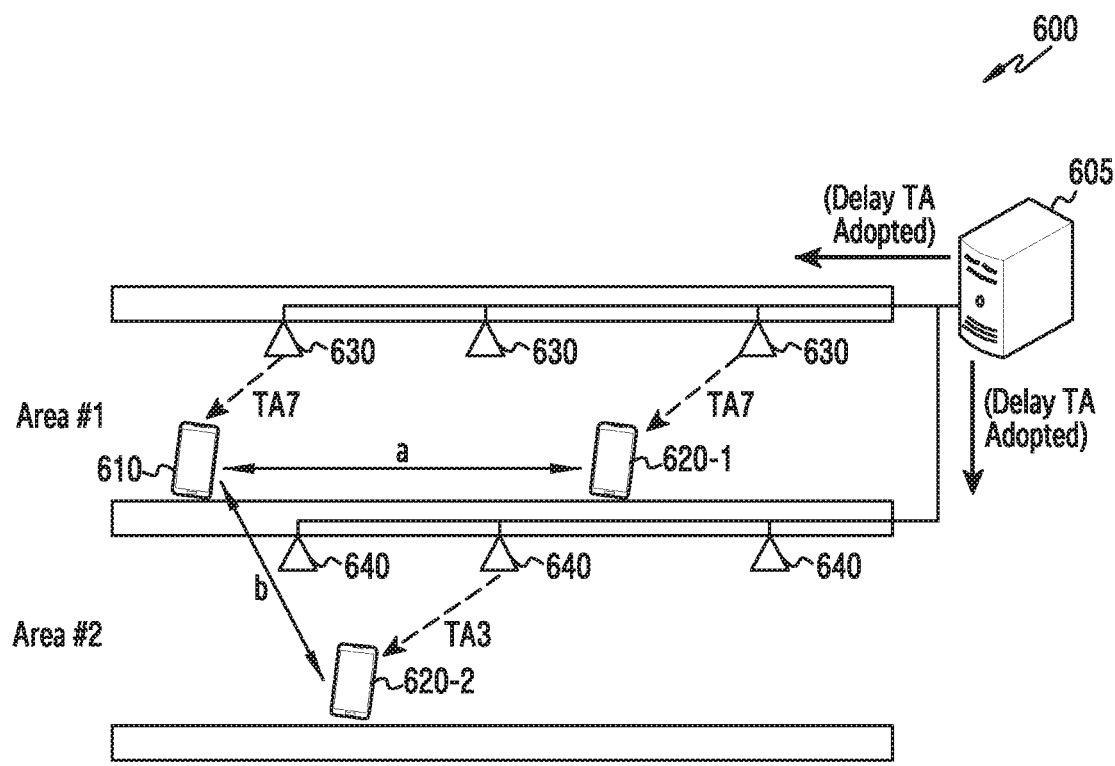
FIG. 6A illustrates a D2D communication environment that identifies members of a dynamic group based on an area where UEs are located according to an embodiment of the present disclosure.

FIG. 6A illustrates a D2D communication environment that identifies at least one UE for a dynamic group based on an area where UEs are located according to an embodiment of the present disclosure.

Referring to FIG. 6A, a communication environment 600 may include a server 605, a master UE 610, a UE 620-1, a UE 620-2, a relay node or remote radio head (RRH) 630, and a relay node 640.

The server 605 may communicate with the relay node 630 and the relay node 640. For example, the server 605 may transmit information to the relay node 630 and the relay node 640, and may receive information from the relay node 630 and the relay node 640. According to some embodiments of the present disclosure, the server 605 may be embodied as a base station, an access point, and the like.

The master UE 610 and the UE 620-1 may be located in area 1 (area #1). The master UE 610 and the UE 620-1 may receive a signal from the relay node 630. The master UE 610 and the UE 620-1 may transmit a signal to the relay node 630.

The UE 620-2 may be located in area 2 (area #2). The UE 620-2 may receive a signal from the relay node 640. The UE 620-2 may transmit a signal to the relay node 640.

The relay node 630 may provide a signal or information received from the server 605, to at least one UE located in the area 1. The relay node 630 may provide, to the server 605, a signal or information received from at least one UE located in the area 1. The relay node 630 may appropriately process information received from the server 605, the master UE 610, or the UE 620-1, and may provide the same to another entity.

The relay node 640 may provide a signal or information received from the server 605, to at least one UE located in the area 2. The relay node 640 may provide, to the server 605, a signal or information received from at least one UE located in the area 2. The relay node 640 may appropriately process information received from the server 605 and the UE 620-2, and may provide the same to another entity.

The server 605 (or base station) may transmit an intentionally corrected (or borrowed) timing advance (TA) (delay TA adapted) to the relay node 630 and the relay node 640. The intentionally corrected TA may be determined based on an uplink TA of the master UE 610 and an uplink TA of the UE 620-1. The intentionally corrected TA may be determined to indicate that the master UE 610 and the UE 620-1 are located in the area 1. For example, the server 605 may transmit, to the relay node 630, TA7 that is intentionally corrected to indicate that the master UE 610 and the UE 620-1 are located in the area 1. As another example, the server 605 may transmit, to the relay node 640, TA3 that is intentionally corrected to indicate that the UE 620-2 is located in the area 2. According to some embodiments of the present disclosure, the server 605 may transmit an uplink TA of the master UE 610 and an uplink TA of the UE 620-1 to the relay node 630. In this instance, the relay node 630 may intentionally correct an uplink TA of the master UE 610 and an uplink TA of the UE 620-1, which are received from the server 605, to indicate that the master UE 610 and the UE 620-1 are located in the area 1. The relay node 630 may transmit the intentionally corrected TA to the master UE 610 and the UE 620-2. In addition, the relay node 640 may intentionally correct an uplink TA of the UE 620-2 received from the server 605, to indicate that the UE 620-2 is located in the area 2. The relay node 640 may transmit the intentionally corrected TA to the UE 620-2.

The relay node 630 may transmit the intentionally corrected TA7 to the master UE 610 and the UE 620-1. The relay node 640 may transmit the intentionally corrected TA3 to the UE 620-2.

The master UE 610 may transmit a request message including information associated with the intentionally corrected TA, or receive a response message including information associated with the intentionally corrected TA, thereby obtaining information associated with the locations of the UE 620-1 and the UE 620-2. For example, it is assumed that the distance between the master UE 610 and the UE 620-1 is a, the distance between the master UE 610 and the UE 620-2 is b, and a is greater than b. In addition, it is assumed that the area 1 and the area 2 are physically separated areas. According to the examples of FIGS. 5A and 5B, the master UE 610 may identify the UE 620-2 (located in the area 2 physically separated), which is incapable of supporting the master UE 610, as a UE for the dynamic group. However, in the communication environment 600, the UE 620-2 recognizes that the intentionally corrected TA is different from the intentionally corrected TA of the master UE 610, and thus, the master UE 610 may create the dynamic group, excluding the UE 620-2 that is substantially incapable of providing a support.

Figure 6B:
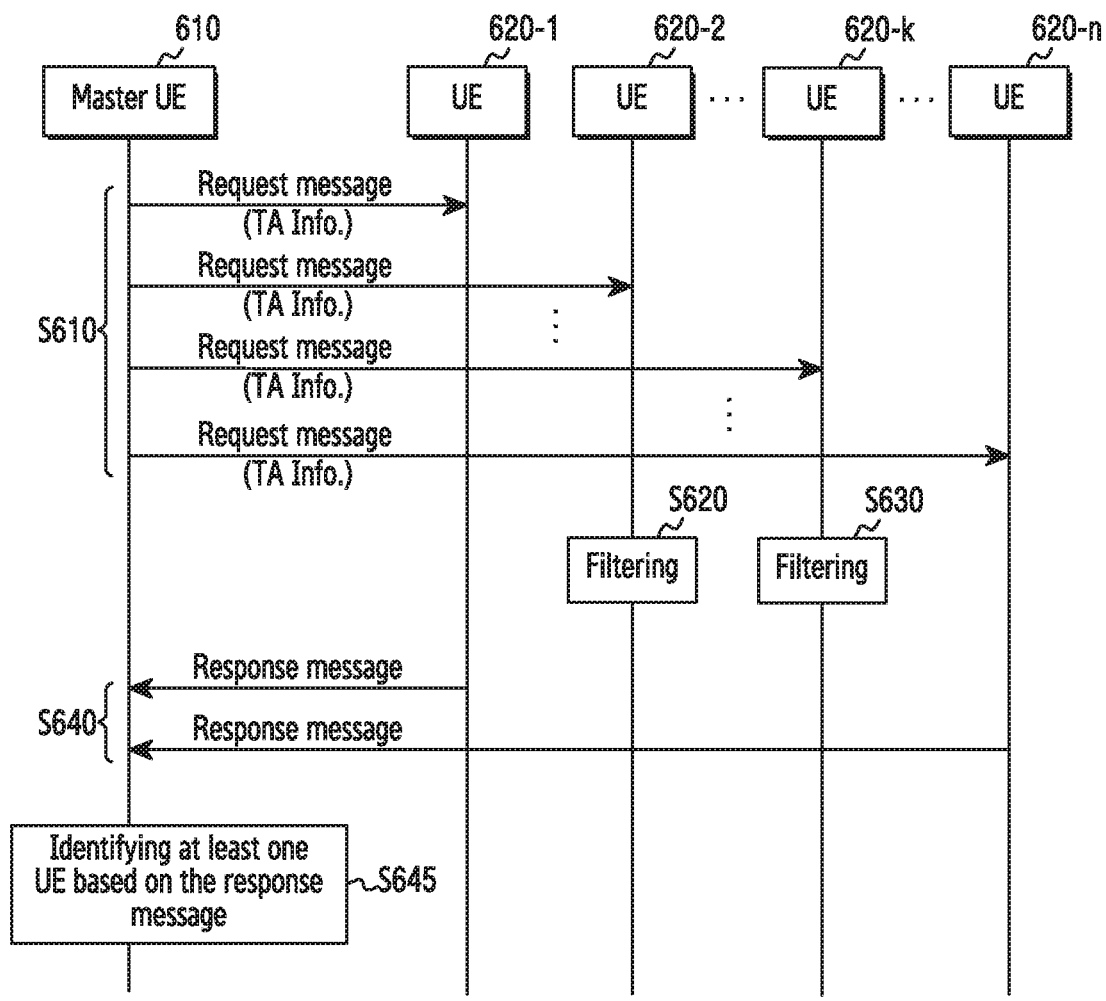
FIG. 6B illustrates a signal flow among UEs for identifying at least one UE for a dynamic group based on an area where UEs are located according to an embodiment of the present disclosure.

FIG. 6B illustrates a signal flow among UEs, for identifying at least one UE for a dynamic group based on an area where UEs are located according to an embodiment of the present disclosure.

Referring to FIG. 6B, the master UE 610 transmits the request message including TA information of a Tx UE to each of the UEs 620-1 to 620-n in operation S610. The master UE 610 may be located in a certain area (e.g., the area 1) which is distinguished from another area (e.g., the area 2). The TA information may be information associated with the intentionally corrected TA. The TA information may be information used for obtaining location information of each of the UEs 620-1 to 620-n. Each of the UEs 620-1 to 620-n may receive the request message including the TA information.

The UE 620-2 filters out the request message in operation S620, and the UE 620-k filters out the request message in operation S630. The UE 620-2 may recognize that an area where the master UE 610 is located and an area where the UE 620-2 is located are segregated from each other, based on the request message. The UE 620-2 is substantially incapable of assisting the master UE 610, and thus, the UE 620-2 may filter out the request message and may not transmit a response message to the master UE 610. The UE 620-k may recognize that an area where the master UE 610 is located and an area where the UE 620-k is located are areas segregated from each other, based on the request message. The UE 620-k is substantially incapable of assisting the master UE 610 and thus, the UE 620-k may filter out the request message and may not transmit a response message to the master UE 610.

In operation S640, UEs (e.g., the UE 620-1 and the UE 620-n) located in an area that is not segregated from the master UE 610 (or having the same TA) from among UEs that receive the request message, transmits a response message to the master UE 610.

In operation S645, the master UE 610 identifies at least one UE for the dynamic group based on the response message. The master UE 610 may determine that a UE that transmits the response message is located in an area that is not segregated. The master UE 610 may identify the UE located in the area that is not segregated, as at least one UE for the dynamic group.

Figure 6C:
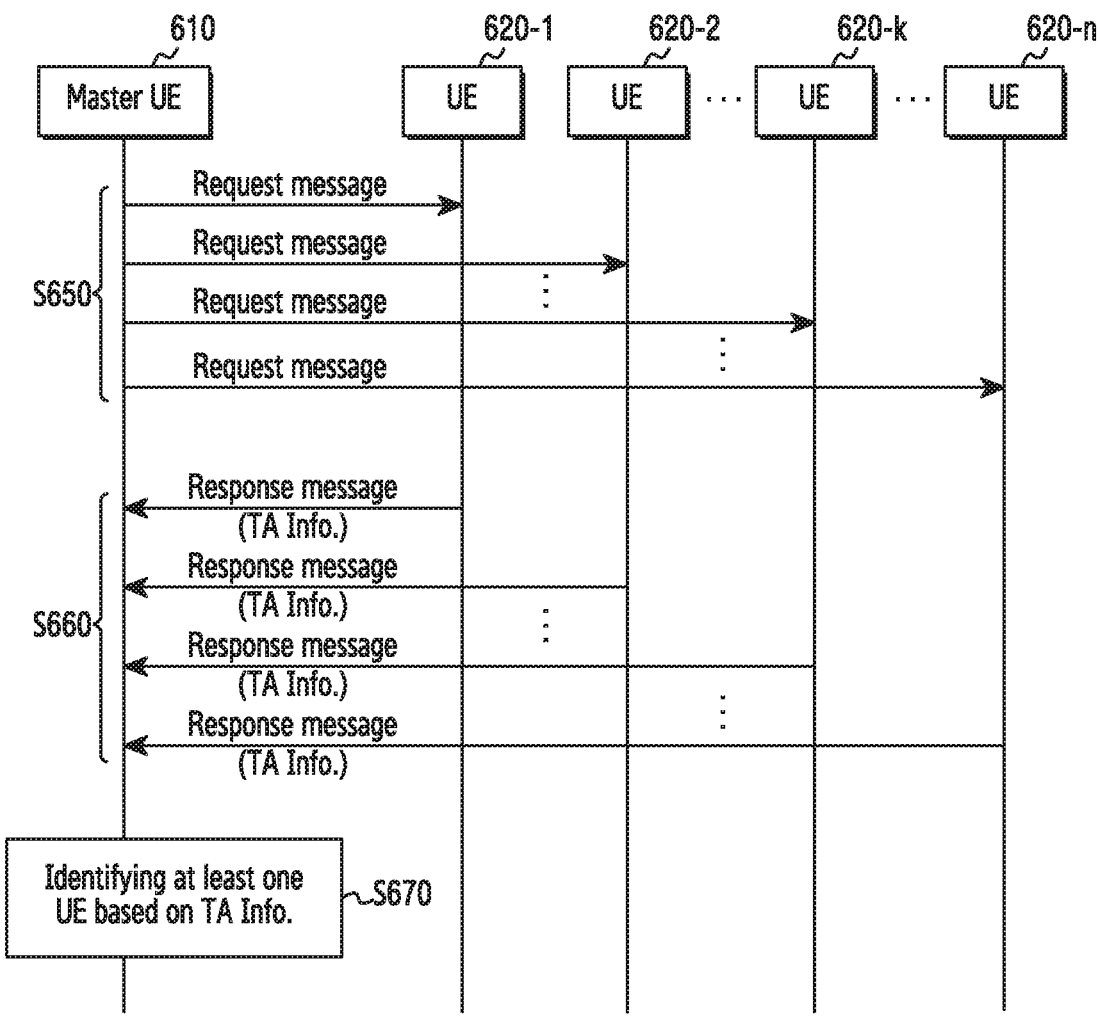
FIG. 6C illustrates a signal flow among UEs, for identifying at least one UE for a dynamic group based on an area where UEs are located according to an embodiment of the present disclosure.

FIG. 6C illustrates a signal flow among UEs, for identifying at least one UE for a dynamic group based on an area where UEs are located according to an embodiment of the present disclosure.

Referring to FIG. 6C, the master UE 610 transmits the request message to each of the UEs 620-1 to 620-n in operation S650. The master UE 610 may be located in a certain area (e.g., the area 1) which is distinguished from another area (e.g., the area 2). The master UE 610 may transmit the request message to each of the UEs 620-1 to 620-n in order to create the dynamic group.

In operation S660, each of the UEs 620-1 to 620-n, which receive the request message, transmits the response message including TA information to the master UE 610. The TA information may be information associated with the intentionally corrected TA. The TA information may be information used for informing the master UE 610 of location information of each of the UEs 620-1 to 620-n. The master UE 610 may receive the response message from each of the UEs 620-1 to 620-n.

In operation S670, the master UE 610 identifies at least one UE for the dynamic group based on the TA information. For example, the master UE 610 may recognize, based on the response message, that the UE 620-1 and the UE 620-n have the same TA as the master UE 610, and the UE 620-2 to the UE 620-n–1 have different TAs from the master UE 610. The master UE 610 may identify the UE 620-1 and the UE 620-n as at least one UE for the dynamic group.

As described in FIGS. 6A, 6B, and 6C, the master UE 610 may obtain location information of the UEs based on the TA information of UEs. The master UE 610 may identify at least one UE for the dynamic group based on the location information. The at least one identified UE is a UE located in a common area with the master UE 610, and thus, the master UE 610 may create a dynamic group with a UE that is substantially meaningful to the master UE 610. The master UE 610 may efficiently respond to a certain event through the dynamic group.

FIGS. 7A, 7B, 7C, 7D, 7E, 7F, 7G illustrate a group create message including a dynamic group ID according to various embodiments of the present disclosure.

Each of UEs that perform D2D communication may determine whether a received signal for D2D communication is for a signal for a corresponding UE, based on a group ID. Therefore, to create, maintain, or control the dynamic group, methods for generating the dynamic group ID are required.

Figure 7A:
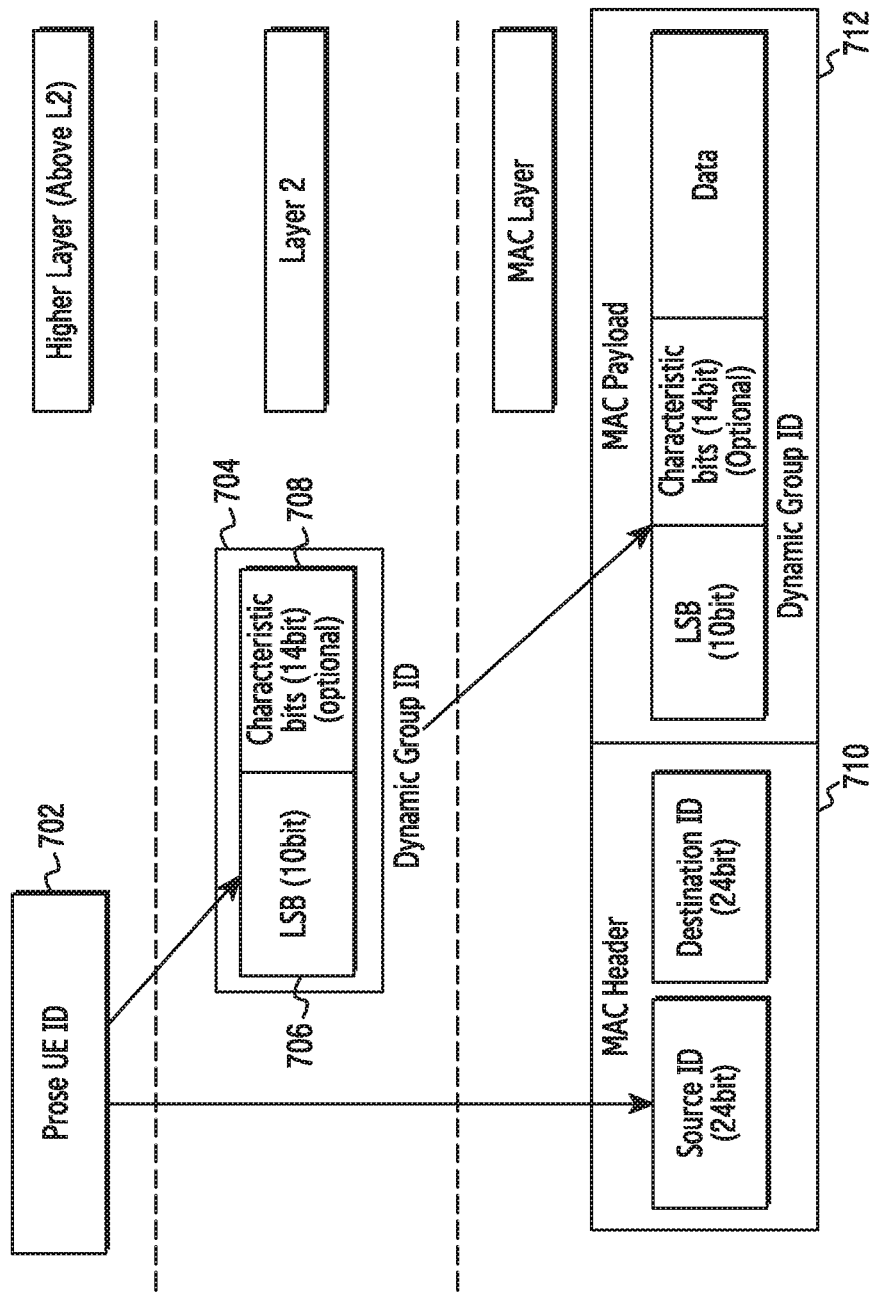
FIGS. 7A, 7B, 7C, 7D, 7E, 7F, and 7G illustrate a group create message including a dynamic group identifier (ID) according to various embodiments of the present disclosure.

Referring to FIG. 7A, a UE (hereinafter, a master UE) that desires to create the dynamic group may have a Prose UE ID 702 in a higher layer (above L2). The Prose UE ID 702 may be an ID for identifying the master UE in D2D communication. For example, the Prose UE ID 702 may be an ID defined in Release 12 of the 3GPP. UEs that perform D2D communication with the master UE may identify the master UE through the Prose UE ID 702 of the master UE.

To create the dynamic group, the master UE may configure (or generate) the dynamic group ID 704 in the layer 2. The dynamic group ID 704 may be an ID for identifying the dynamic group. The dynamic group ID 704 may include a least significant bit (LSB) 706 of 10 bits of the Prose UE ID 702. According to some embodiments of the present disclosure, when the master UE desires to create a plurality of dynamic groups, neighboring UEs of the master UE may not distinguish the plurality of dynamic groups based on only the LSB 706 of 10 bits of the Prose UE ID 702. In this instance, the master UE may generate the dynamic group ID 704 by including characteristic bits 708, so as to generate the plurality of dynamic groups. The characteristic bits 708 may be bits for distinguishing the plurality of dynamic groups. According to some embodiments of the present disclosure, the characteristic bits 708 may be formed of 14 bits.

To create the dynamic group, the master UE may configure (or generate) a medium access control (MAC) header 710 for D2D communication based on the Prose UE ID 702, in a MAC layer. The MAC header 710 may include a source ID and a destination ID. According to some embodiments of the present disclosure, the source ID may be an ID for identifying the master UE in D2D communication. The source ID may be formed of 24 bits. The destination ID may be an ID of a fixed group. According to some embodiments of the present disclosure, the destination ID may be formed of 24 bits. A UE that receives a D2D signal including the MAC header 710 may recognize that a main agent that transmits the D2D signal is the master UE included in the fixed group, based on the source ID and the destination ID.

In the MAC layer, the master UE may configure (or generate) a MAC payload 712 including the dynamic group ID 704 configured (or generated) in the layer 2. The MAC payload 712 may include the dynamic group ID 704 and data. The data may include various pieces of information. According to some embodiments of the present disclosure, the data may include information that the master UE desires to transfer to at least one UE included in the dynamic group. For example, the data may include information associated with a distance to where a request for supporting comes from, time information, information associated with the number of persons requested for supporting, and the like.

The master UE may transmit a group create message (or a MAC protocol data unit (PDU)) including the MAC header 710 and the MAC payload 712, to at least one UE for the dynamic group. According to some embodiments of the present disclosure, the group create message may be transmitted through a signal of side link direct communication defined in the 3GPP Release 12.

Figure 7B:
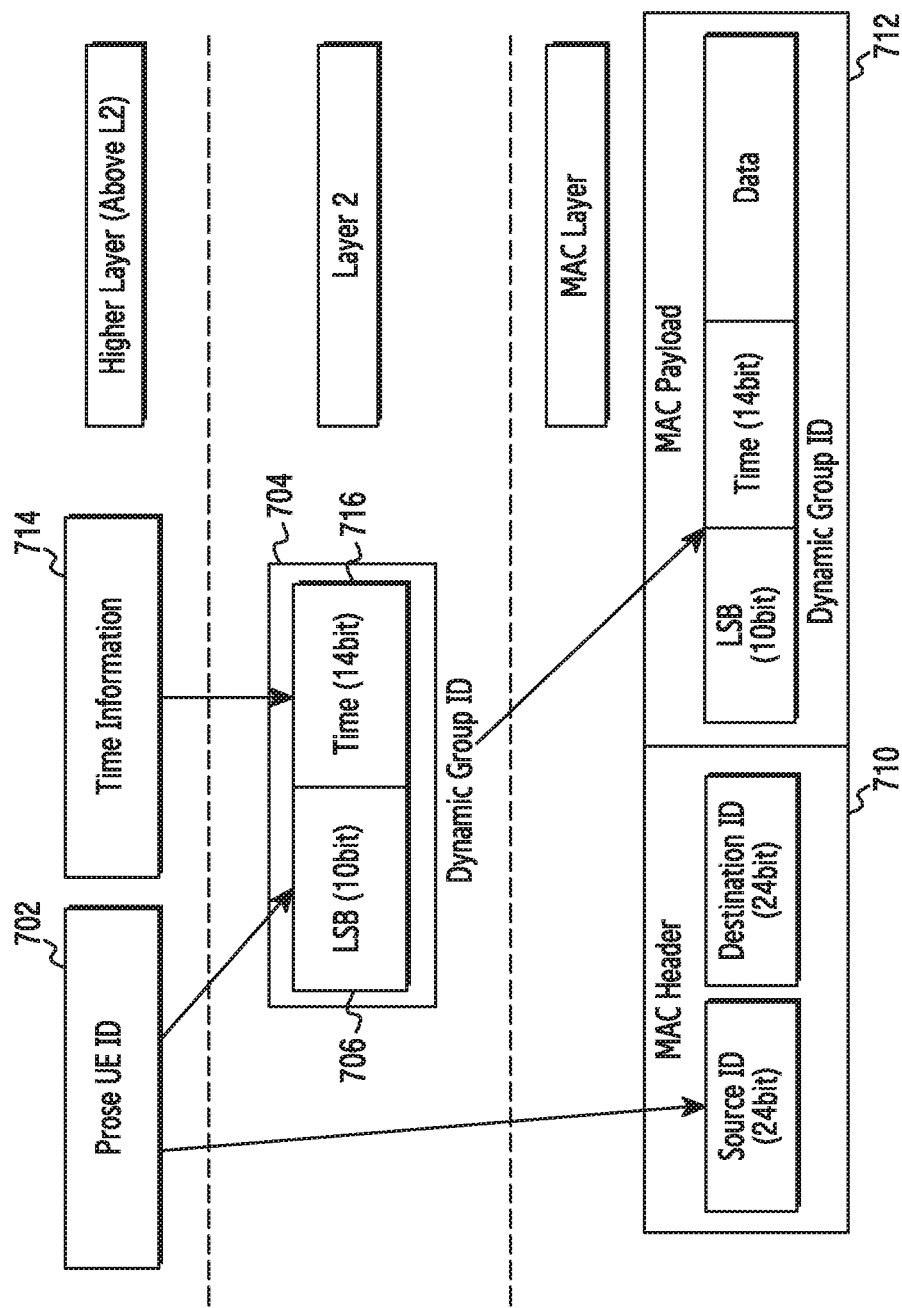

Referring to FIG. 7B, the master UE may have the Prose UE ID 702 and time information 714 in a higher layer. Time information 716 may be information associated with a time when the master UE generates the dynamic group ID. The time information 714 may be bits used when the master UE distinguishes each of the plurality of dynamic groups. In other words, the time information 714 may be an example of the characteristic bits. According to some embodiments of the present disclosure, the time information 714 may be formed of 14 bits. When the time information 714 is formed of 14 bits, the time information 716 may indicate a time from 0.000 to 9.999 seconds.

To create the dynamic group, the master UE may configure the dynamic group ID 704 including the LSB 706 of 10 bits based on the Prose UE ID 702 and the time information 716 corresponding to the time information 714, in the layer 2.

To create the dynamic group, the master UE may generate the MAC header 710 including the source ID and the destination ID, and may generate the MAC payload 712 including the dynamic group ID 704 generated in the layer 2 and the data, in the MAC layer.

The master UE may transmit a group create message including the MAC header 710 and the MAC payload 712, to at least one UE for the dynamic group. According to some embodiments of the present disclosure, the group create message may be transmitted through a signal of side link direct communication defined in the 3GPP Release 12.

Figure 7C:
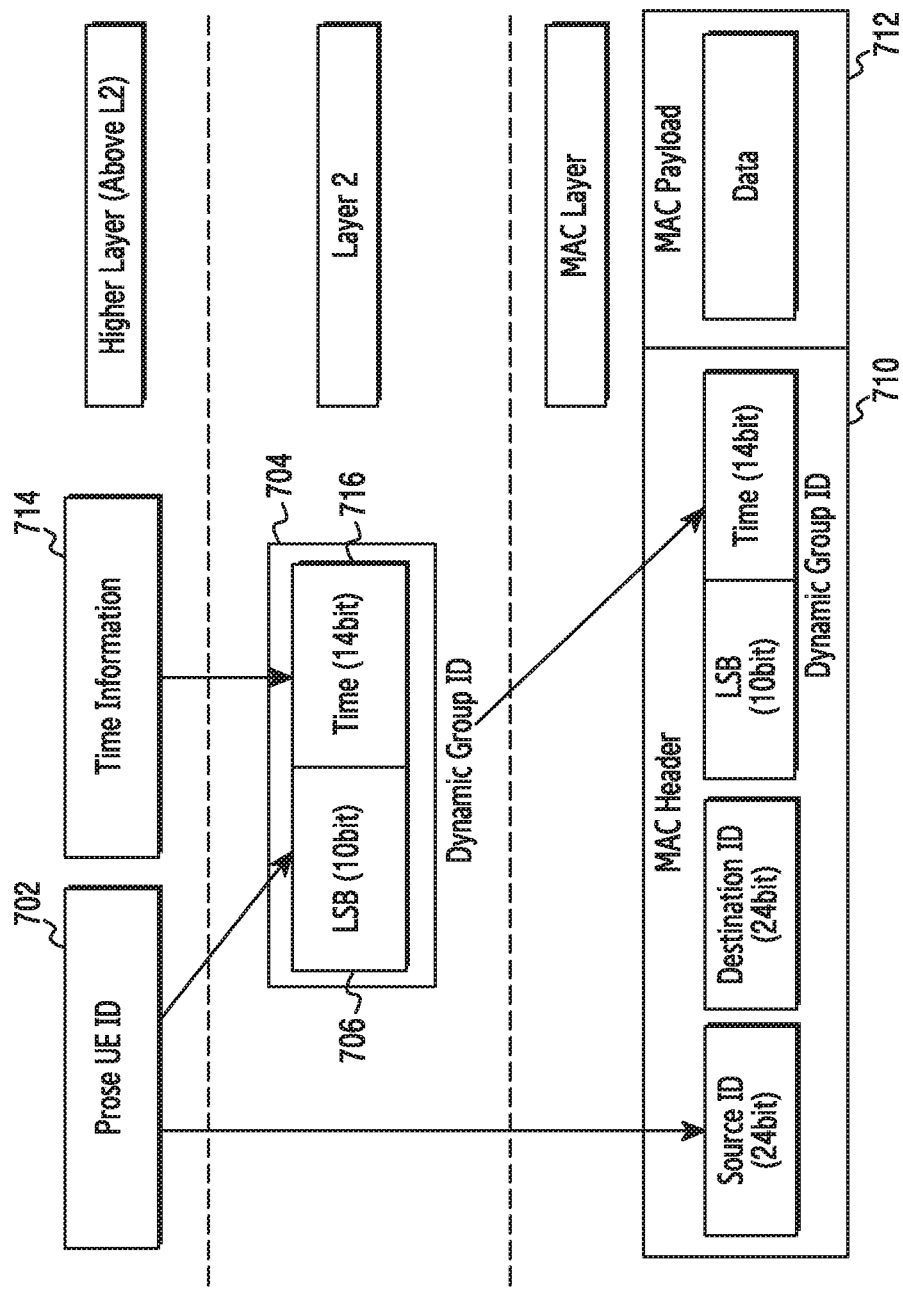

Referring to FIG. 7C, the master UE may insert the dynamic group ID 704 generated in the layer 2 into the MAC header 710, unlike FIG. 7B. In this instance, the master UE may generate the MAC header 710 including the source ID, the destination ID, and the dynamic group ID, and may generate the MAC payload 712 including the data, in the MAC layer.

The master UE may transmit a group create message including the MAC header 710 and the MAC payload 712, to at least one UE for the dynamic group. According to some embodiments of the present disclosure, the group create message may be transmitted through a signal of side link direct communication defined in the 3GPP Release 12.

Figure 7D:
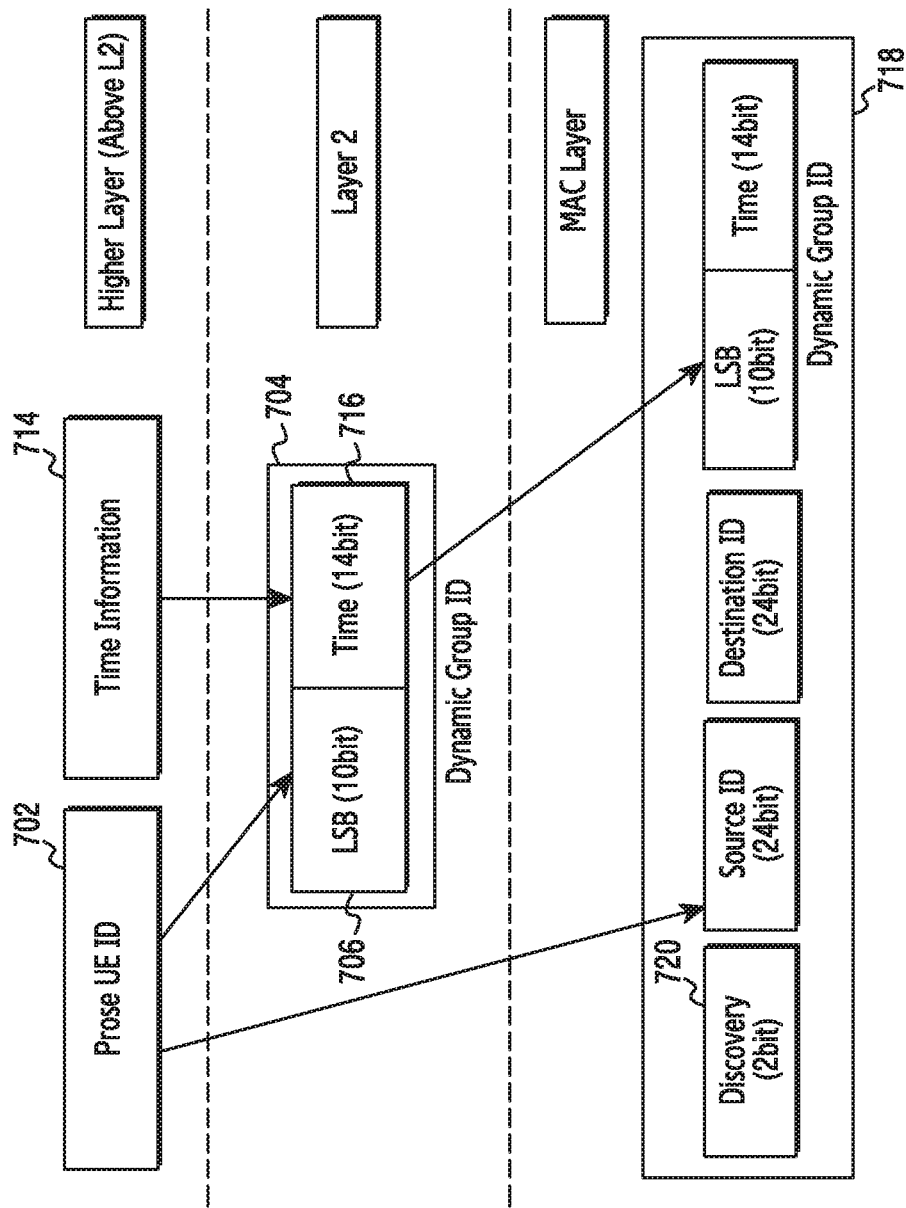

Referring to FIG. 7D, the master UE may generate, in the MAC layer, the group create message including the dynamic group ID 718 generated in the layer 2. The group create message may include Discovery 720, the source ID, the destination ID, and the dynamic group ID 704. The Discovery 720 may be a field indicating a type of discovery. According to some embodiments of the present disclosure, the Discovery 720 may be formed of 2 bits. For example, when the Discovery 720 is "00", the type of discovery may be "open discovery" for a normally used UE. The group create message may be transmitted as a signal of sidelink direct discovery defined in the 3GPP Release 12. The group create message may be configured using reserved bits from among D2D discovery message types.

Figure 7E:
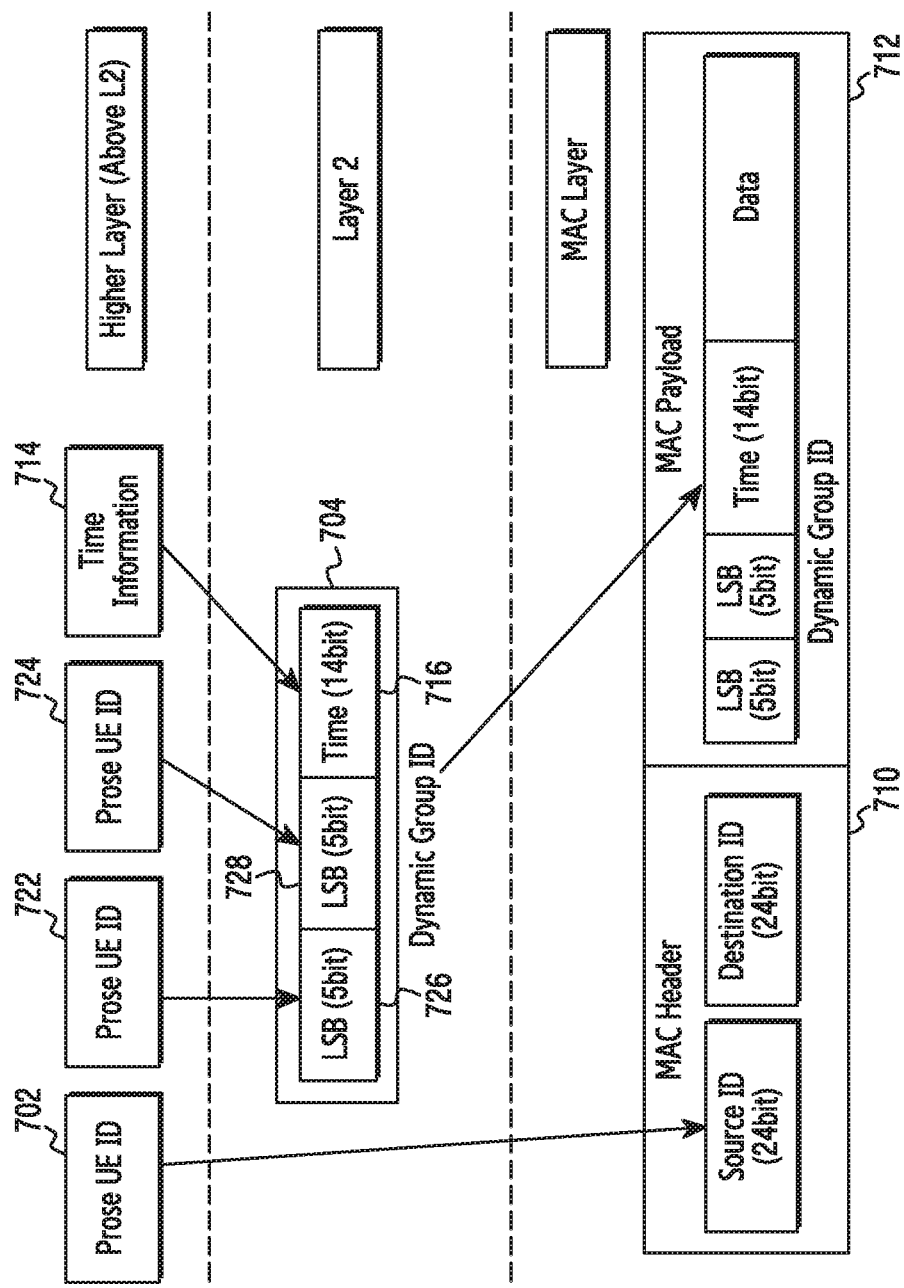

Referring to FIG. 7E, the master UE may have the Prose UE ID 702, a Prose UE ID 722, a Prose UE ID 724, and the time information 714 in a higher layer. The Prose UE ID 722 and the Prose UE ID 724 may be IDs for D2D communication of UEs for the dynamic group.

To create the dynamic group, the master UE may generate the dynamic group ID including a LSB 726 of 5 bits of the Prose UE ID 722, a LSB 728 of 5 bits of the Prose UE ID 724, and the time information 716, in the layer 2.

To create the dynamic group, the master UE may generate the MAC header 710 including the source ID and the destination ID, and may generate the MAC payload 712 including the dynamic group ID generated in the layer 2 and the data.

The master UE may transmit the group create message including the MAC header 710 and the MAC payload 712 to at least one UE for the dynamic group.

Figure 7F:
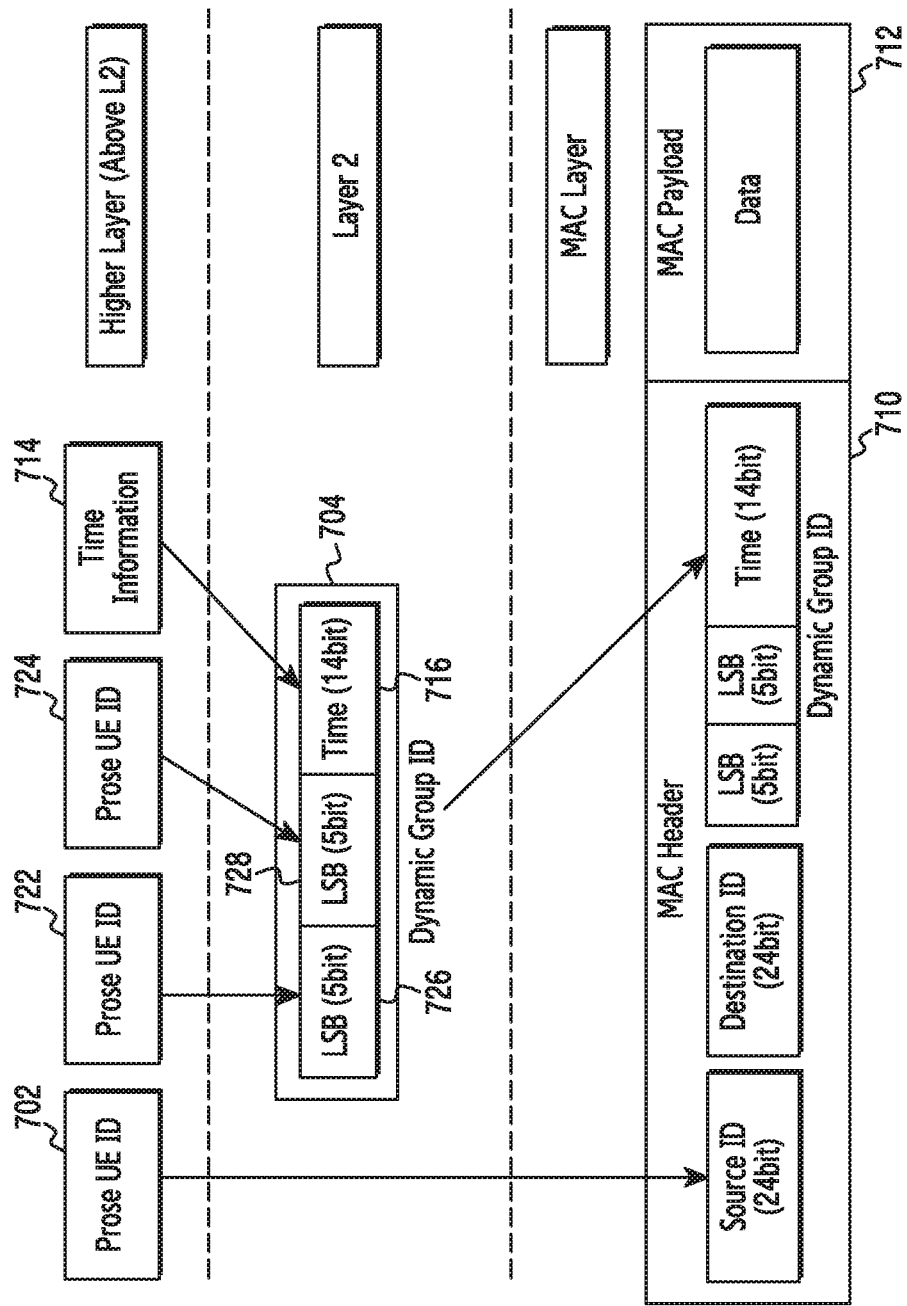

Referring to FIG. 7F, the master UE may include the source ID, the destination ID, and the dynamic group ID 704 in the MAC header 710, unlike FIG. 7E.

The master UE may transmit the MAC header 710 including the source ID, the destination ID, and the dynamic group ID 704, and the MAC payload 712 including the data, to at least one UE for the dynamic group.

Figure 7G:
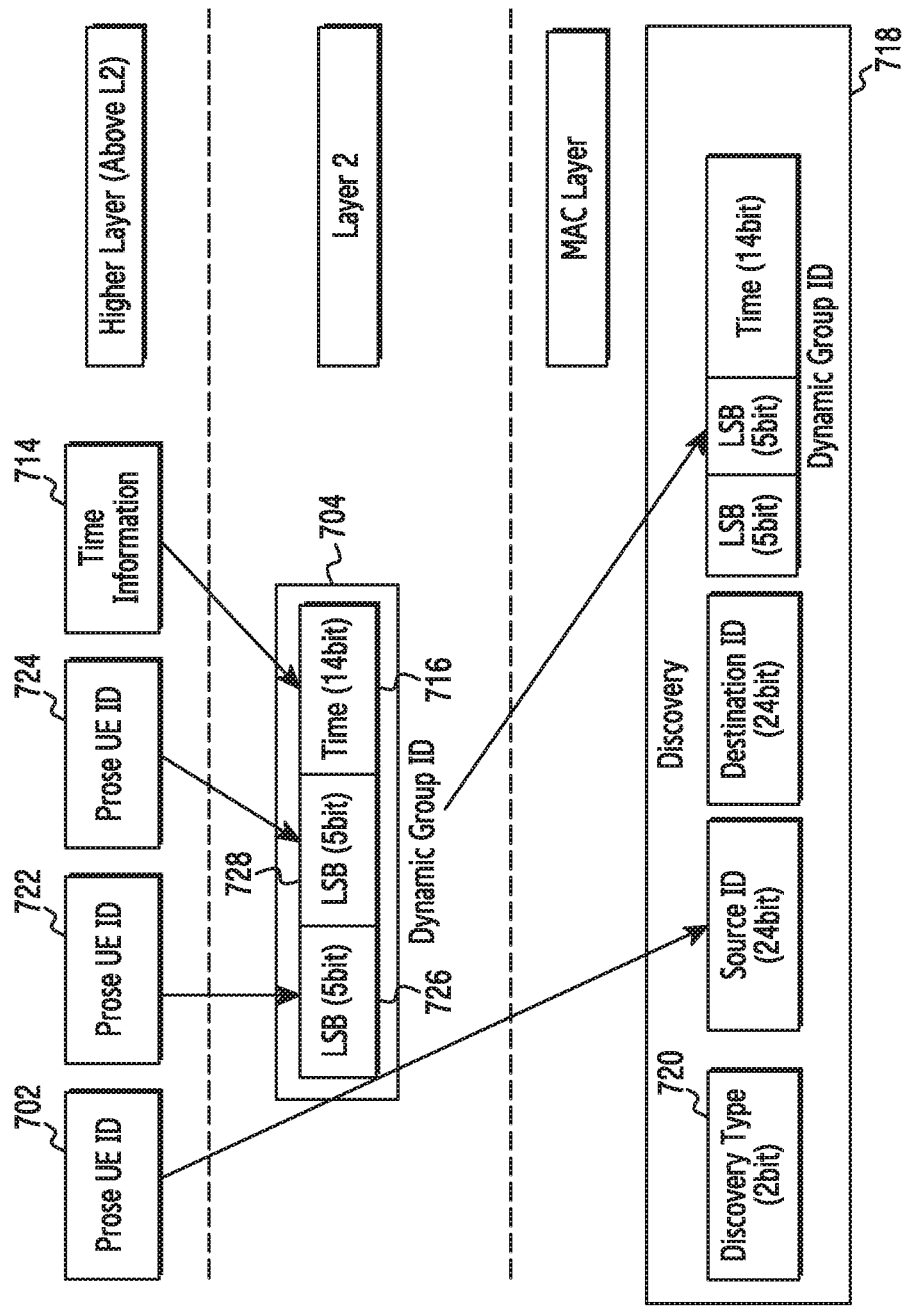

Referring to FIG. 7G, the master UE may generate, in the MAC layer, the group create message including the dynamic group ID generated in the layer 2. The group create message may include Discovery 720, the source ID, the destination ID, and the dynamic group ID 704. The dynamic group ID 704 may include the LSB 726 of 5 bits and the LSB 728 of 5 bits, and the time information 716. According to some embodiments of the present disclosure, Discovery 720 may be formed of 2 bits. The group create message may be transmitted as a signal of sidelink direct discovery defined in the 3GPP Release 12. The group create message may be configured using reserved bits from among D2D discovery message types.

Referring to FIGS. 7A, 7B, 7C, 7D, 7E, 7F, and 7G, the master UE may generate and transmit the various types of group create messages including the various types of dynamic group IDs. Through the various types of dynamic group IDs, the master UE may configure multiple dynamic groups, and may avoid a collision with another dynamic group. In addition, through the various types of group create messages, the master UE may generate and transmit various types of group create messages based on a state of the master UE.

Figure 8A:
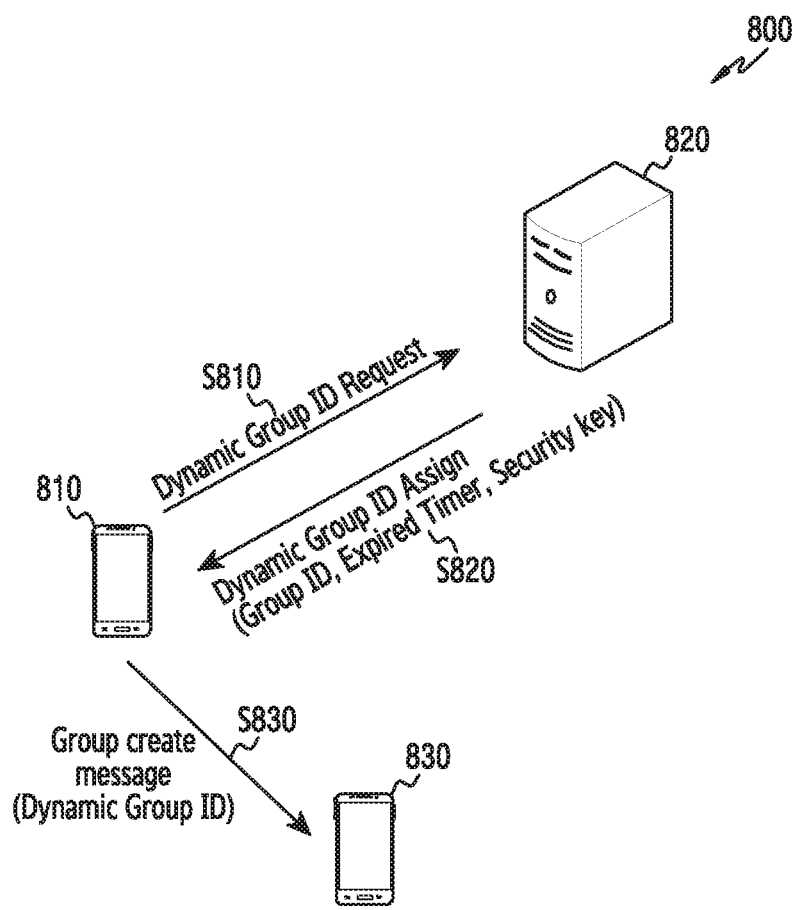
FIG. 8A illustrates a D2D communication environment which generates a dynamic group ID using a server according to an embodiment of the present disclosure.

FIG. 8A illustrates a D2D communication environment which generates a dynamic group ID using a server according to an embodiment of the present disclosure.

Referring to FIG. 8A, a communication environment 800 may include a master UE 810, a server 820, and a UE 830.

The master UE 810 may be a UE that desires to create a dynamic group. The server 820 may be a server that provides a service to the master UE 810. According to some embodiments of the present disclosure, the server 820 may be embodied as a base station. The UE 830 may be a UE located around the master UE 810. The UE 830 may be a UE that receives a request message from the master UE 810. The UE 830 may be a UE that transmits a response message to the master UE 810. The UE 830 may be at least one UE that the master UE 810 identifies for the dynamic group.

The master UE 810 requests a dynamic group ID from the server 820 in operation S810, unlike the examples of FIGS. 7A, 7B, 7C, 7D, 7E, 7F, and 7G. For example, the master UE 810 may request the dynamic group ID from the server 820, to distinguish the dynamic group ID from another dynamic group ID.

In operation S820, the server 820 that receives the request for the dynamic group ID allocates the dynamic group ID to the master UE 810. For example, a message including the dynamic group ID allocated to the master UE 810 may include information associated with an expiration timer of the dynamic group and a security key. The dynamic group ID that the server 820 allocates to the master UE 810 may be configured to be distinguished from another dynamic group ID.

In operation S830, the master UE 810 that receives the allocated dynamic group ID may transmit the group create message including the dynamic group ID to the UE 830. The master UE 810 may transmit the group create message to the UE 830 to configure a group with the UE 830. The UE 830 may receive the group create message from the master UE 810.

Through the above described example of FIG. 8A, the master UE 810 and the UE 830 may configure the dynamic group. Through the configured dynamic group, the master UE 810 and the UE 830 may transmit and receive traffic. For example, the master UE 810 may transmit information for requesting supporting from the UE 830, through a channel corresponding to the configured dynamic group. As another example, the UE 830 may transmit information for assisting the master UE 810 or the like to the master UE 810, through a channel corresponding to the configured dynamic group.

Figure 8B:
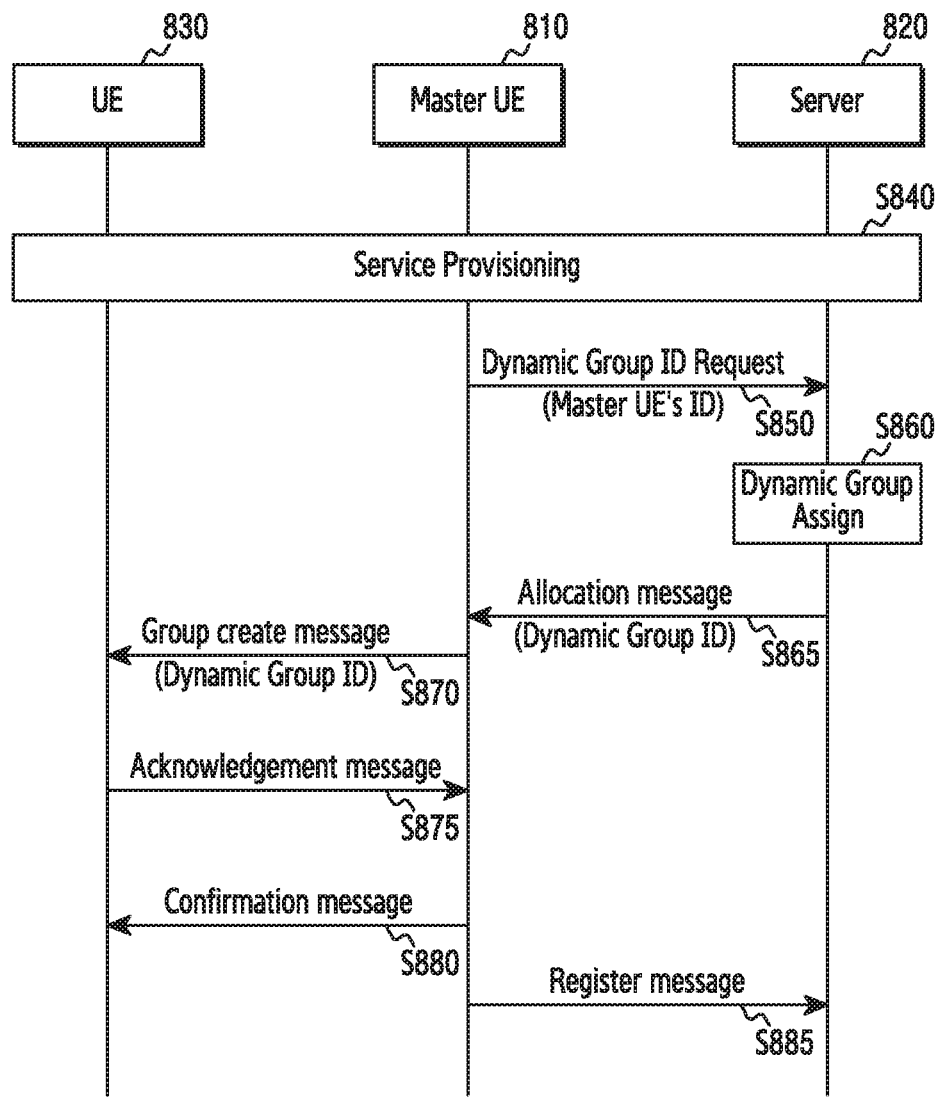
FIG. 8B illustrates a signal flow between a server and a user that generates a dynamic group ID using the server according to an embodiment of the present disclosure.

FIG. 8B illustrates a signal flow between a server and a user that generates a dynamic group ID using the server according to an embodiment of the present disclosure.

Referring to FIG. 8B, the master UE 810 and the UE 830 perform a service provisioning operation with the server 820 in order to receive a service from the server 820 in operation S840. The service may be a Wi-Fi service, a cellular service, or the like. According to some embodiments of the present disclosure, each of the master UE 810 and the UE 830 may perform an initial access procedure with the server 820, to perform the service provisioning operation. According to some other embodiments of the present disclosure, only the master UE 810 may perform the service provisioning operation with the server 820. In other words, the UE 830 may not be provided with a service from the server 820.

In operation S850, the master UE 810 transmits, to the server 820, a message for requesting the dynamic group ID. The message for requesting the dynamic group ID may include an ID of the master UE 810 for identifying the master UE 810. The server 820 may identify that the message for requesting the dynamic group ID is transmitted from the master UE 810, based on the ID of the master UE 810.

In operation S860, the server 820 may allocate the dynamic group ID for the master UE 810. The server 820 may allocate the dynamic group ID for the master UE 810, so as to distinguish the dynamic group ID from another dynamic group ID.

In operation S865, the server 820 transmits an allocation message including the allocated dynamic group ID to the master UE 810. For example, the server 820 may transmit the allocation message including the dynamic group ID to the master UE 810 through cellular communication. The allocation message may further include information associated with an expiration time of the dynamic group, a security key for the dynamic group, and the like. The master UE 810 may receive the allocation message from the server 820.

In operation S870, the master UE 810 transmits the group create message including the dynamic group ID to the UE 830. According to some embodiments of the present disclosure, the group create message may further include additional information or the like, in addition to the dynamic group ID. For example, the group create message may include data (or data field) of the MAC payload 712 illustrated in FIG. 7A or the like.

In operation S875, the UE 830 transmits an acknowledgement message to the master UE 810. The acknowledgement message may be a message for indicating that the UE 830 receives the dynamic group ID. The acknowledgement message may be a message for reporting that the UE 830 approves of creation (or configuration) of a dynamic group with the master UE 810. The master UE 810 may receive the acknowledgement message from the UE 830.

In operation S880, the master UE 810 transmits, to the UE 830, a confirmation message indicating that the dynamic group is created. According to some embodiments of the present disclosure, the confirmation message may further include information associated with a security key, an expiration time of the dynamic group, and the like. The UE 830 may receive the confirmation message from the master UE 810.

In operation S885, the master UE 810 transmits, to the server 820, a register message indicating that the dynamic group is created. The register message may be a message for reporting that the dynamic group ID that the server 820 provides to the master UE 810 is actually used. The server 820 may readily identify another dynamic group ID allocated to other UEs through the register message. For example, the server 820 may allocate, to at least one other UE, a dynamic group ID excluding the dynamic group ID allocated for the master UE 810.

According to embodiments of the present disclosure, a signal flow from operations S875 to S885 may be omitted.

Figure 9:
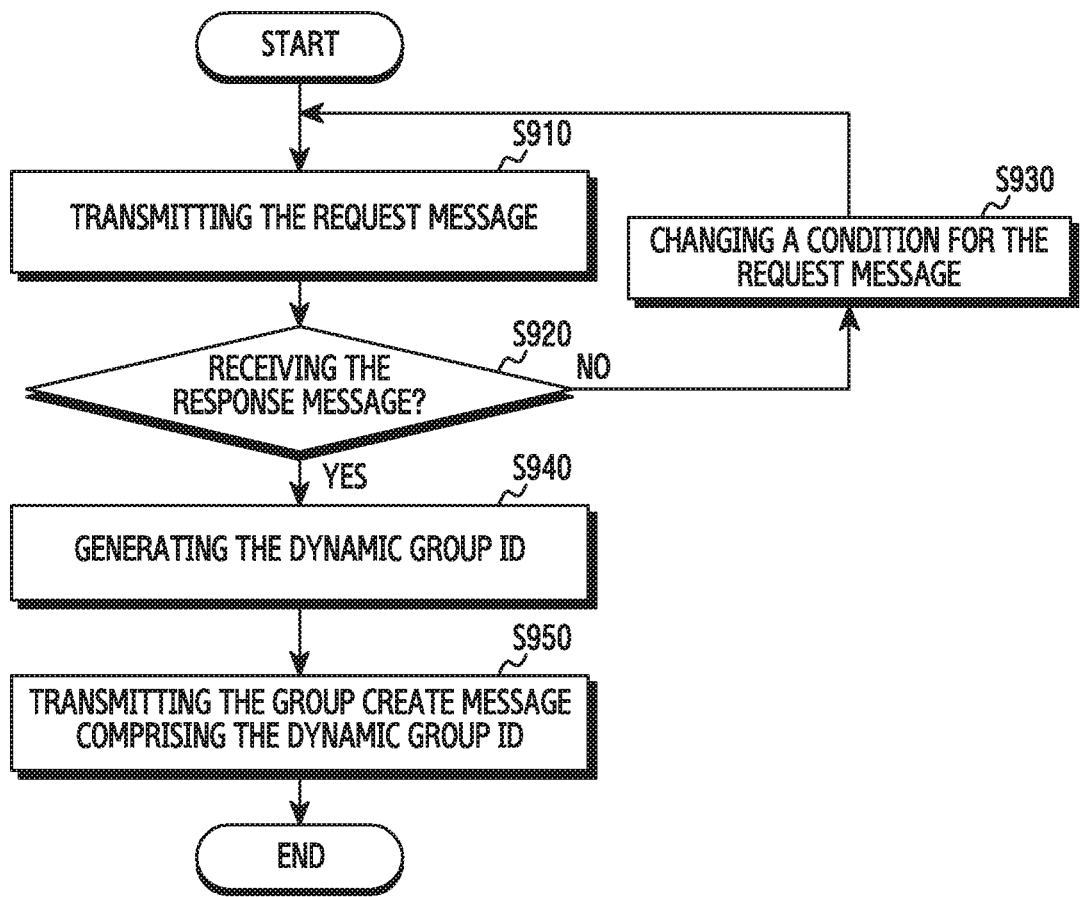
FIG. 9 illustrates operations of a UE that creates a dynamic group according to an embodiment of the present disclosure.

FIG. 9 illustrates operations of a UE that creates a dynamic group according to an embodiment of the present disclosure.

Referring to FIG. 9, the master UE transmits a request message to neighboring UEs in operation S910. For example, in the state in which an upper node (e.g., a base station or the like) is unavailable, when a user who carries the master UE requests supporting from users of other UEs, the master UE may transmit the request message to neighboring UEs through D2D communication. According to some embodiments of the present disclosure, the request message may include information indicating that the master UE desires to create a dynamic group. According to some other embodiments of the present disclosure, the request message may include information associated with a UE having a condition desired by the master UE. For example, the request message may include information indicating that the master UE desires a UE located in an area of which the distance to the master UE is less than a certain value, and information associated with a condition that requires a UE that receives the request message to transmit a response message.

In operation S920, the master UE identifies whether the response message is received. When the response message is not received, the master UE proceeds with operation S930. Unlike the above, when the response message is received, the master UE proceeds with operation S940.

In operation S930, the master UE changes a condition associated with the request message. The condition associated with the request message may be a concept including a transmission environment of the request message, a change in information included in the request message, or the like. For example, the master UE may determine that the request message does not arrive at the neighboring UEs. In this instance, the master UE may determine to raise a transmission power of the request message. As another example, the master UE may determine that the request message arrives at the neighboring UEs, and a UE does not exist, which satisfies the condition that is included in the request message and the master UE desires. In this instance, the master UE may ease the condition that is included in the request message and the master UE desires.

In operation S940, in response to a reception of the response message, the master UE generates a dynamic group ID. The dynamic group ID has a value distinguished from a fixed group ID. The dynamic group ID has a value distinguished from another dynamic group ID.

In operation S950, the master UE transmits the group create message including the dynamic group ID. According to some embodiments of the present disclosure, the master UE broadcasts a group create message including the dynamic group ID, through a D2D broadcasting signal. According to some other embodiments of the present disclosure, the master UE specifies at least one UE identified for the dynamic group, and transmits the group create message including the dynamic group ID.

Referring to FIG. 9, the master UE may configure (or create) a dynamic group with other UEs through the request message transmission process, the response message reception process, and the group create message transmission process. Through the dynamic group, the master UE may actively cope with an emergency situation or an unexpected situation. In addition, through the dynamic group, the master UE may perform D2D communication with at least one other UE in a better environment. In addition, the master UE is included in the dynamic group, in addition to the fixed group, and thus, may perform D2D communication of various options.

Figure 10A:
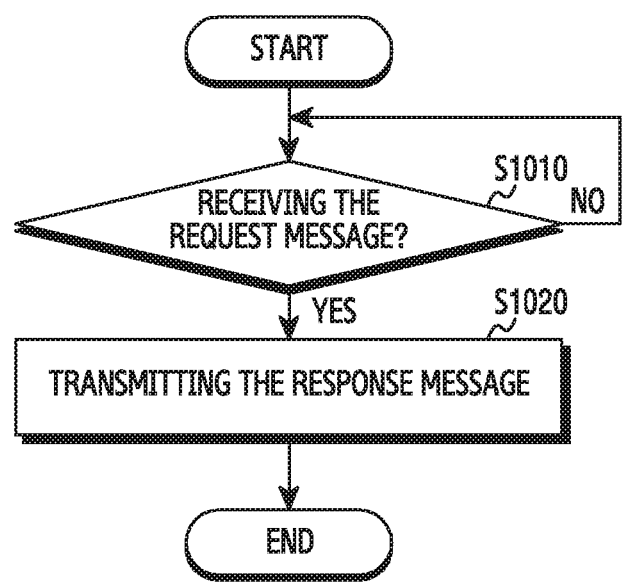
FIG. 10A illustrates operations of a UE according to an embodiment of the present disclosure.

FIG. 10A illustrates operations of a UE according to an embodiment of the present disclosure.

Another UE may be a UE that configures (or creates) a dynamic group with a master UE.

Referring to FIG. 10A, the other UE identifies whether a request message is received from the master UE in operation S1010. When the request message is received, the other UE proceeds with operation S1020. Unlike the above, when the request message is not received, the other UE periodically determines whether the request message is received. According to the settings of the other UE, the other UE identifies whether the request message is received during a designated period of time, and interrupts identifying whether the request message is received.

In operation S1020, the other UE transmits a response message. The other UE transmits the response message to the master UE in response to a reception of the request message. According to some embodiments of the present disclosure, the other UE does not specify a reception (Rx) UE of the response message, and broadcasts the response message. In this instance, the other UE may broadcast the response message that further includes an ID of the master UE that transmits the request message.

Figure 10B:
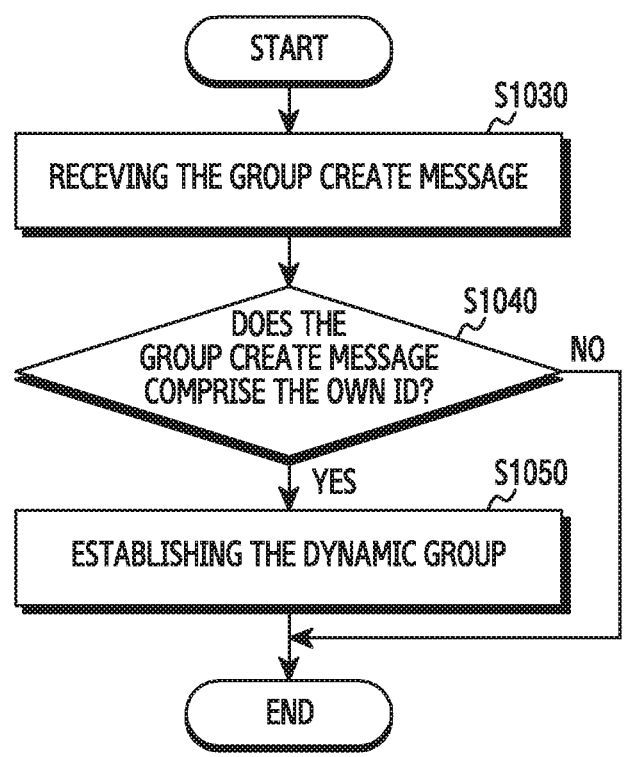
FIG. 10B illustrates operations of a UE according to an embodiment of the present disclosure.

FIG. 10B illustrates operations of a UE according to an embodiment of the present disclosure.

Referring to FIG. 10B, the other UE receives a group create message in operation S1030. The other UE may receive the group create message including a dynamic group ID for a dynamic group from the master UE.

In operation S1040, the other UE identifies whether the group create message includes an ID of the other UE itself. According to embodiments of the present disclosure, the group create message may be broadcasted from the master UE, and thus, the other UE identifies whether the group create message includes the ID of the other UE, in order to determine whether the group create message is a message for the other UE. When the ID of the other UE is not included in the group create message, the other UE may terminate an operation associated with the dynamic group. Unlike the above, when the ID of the other UE is included in the group create message, said another UE proceeds with operation S1050.

In operation S1050, the other UE configures the dynamic group with the master UE or the like. According to some embodiments of the present disclosure, the dynamic group may be a group for assisting or supplementing a fixed group. According to some other embodiments of the present disclosure, the dynamic group may be a group configured for a certain purpose. According to some other embodiments of the present disclosure, the dynamic group may be a group for supplementing a poor D2D communication environment.

Figure 11A:
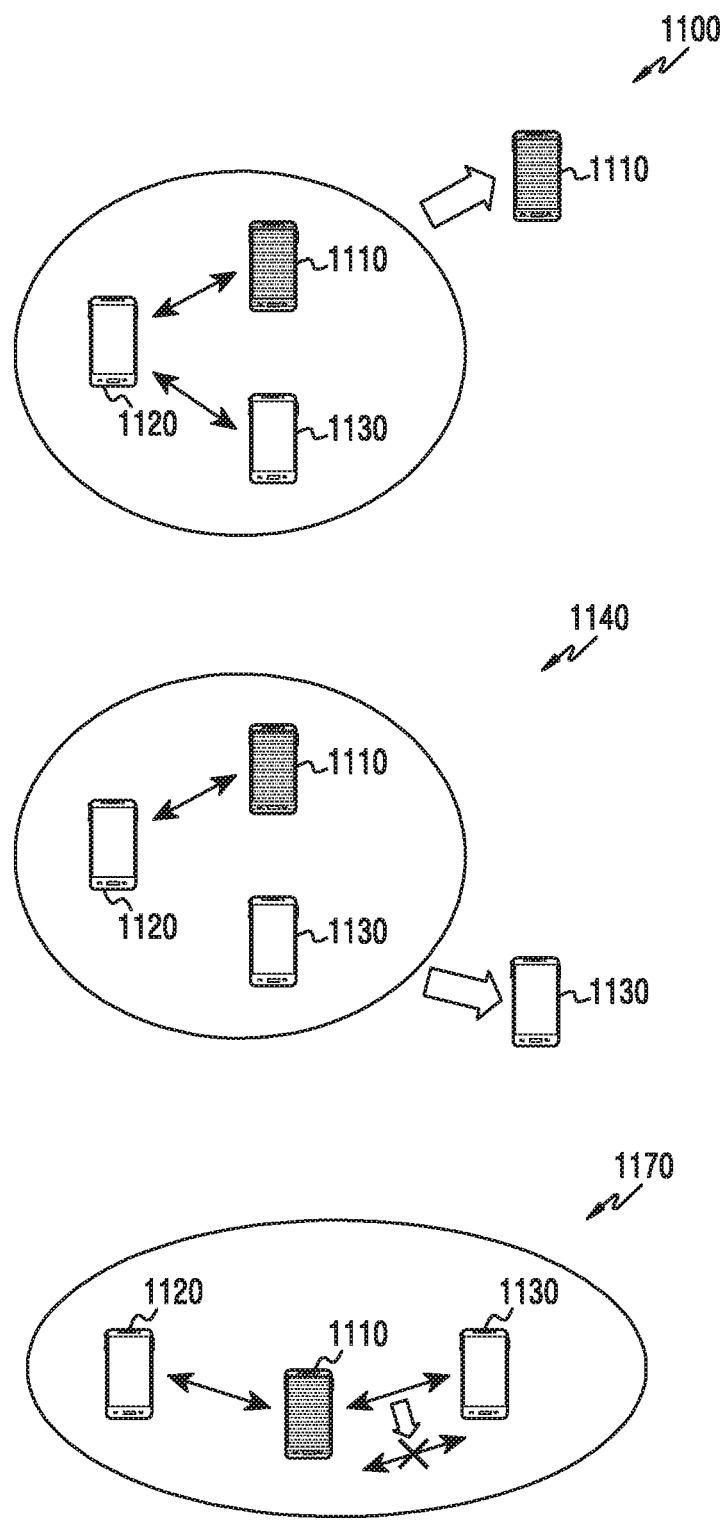
FIG. 11A illustrates withdrawal from a dynamic group according to an embodiment of the present disclosure.

FIG. 11A illustrates withdrawal from a dynamic group according to an embodiment of the present disclosure.

Referring to FIG. 11A, a scenario 1100, a scenario 1140, and a scenario 1170 may include a master UE 1110 that creates a dynamic group, a UE 1120 included in the dynamic group, and a UE 1130 included in the dynamic group.

The scenario 1100 may be a scenario in which the master UE 1110 withdraws (or leaves) from the dynamic group. For example, when the master UE 1110 is out of a coverage area of D2D communication of the UE 1120 and the UE 1130, the master UE 1110 may withdraw from the dynamic group. As another example, when the master UE 1110 terminates an operation required in the dynamic group, the master UE 1110 may withdraw from the dynamic group. As another example, when the master UE 1110 does not transmit any D2D signal through a channel corresponding to the dynamic group during a designated period of time, the master UE 1110 may withdraw from the dynamic group. As another example, the master UE 1110 may explicitly withdraw from the dynamic group according to a change of a state.

The scenario 1140 is a scenario in which the UE 1130 included in the dynamic group withdraws from the dynamic group. For example, when the UE 1130 is out of a coverage area of D2D communication of the master UE 1110 and the UE 1120, the UE 1130 may withdraw from the dynamic group. As another example, the UE 1130 may explicitly withdraw from the dynamic group according to a change of a state.

The scenario 1170 may be a scenario in which the UE 1130 included in the dynamic group is disconnected from the D2D communication with the master UE 1110 (or the UE 1120). For example, when the battery of the UE 1130 is discharged, the UE 1130 may withdraw from the dynamic group due to the disconnection of D2D communication. As another example, when the UE 1130 is located in an area having a bad communication quality, the UE 1130 may withdraw from the dynamic group due to the disconnection of D2D communication with other UEs.

Figure 11B:
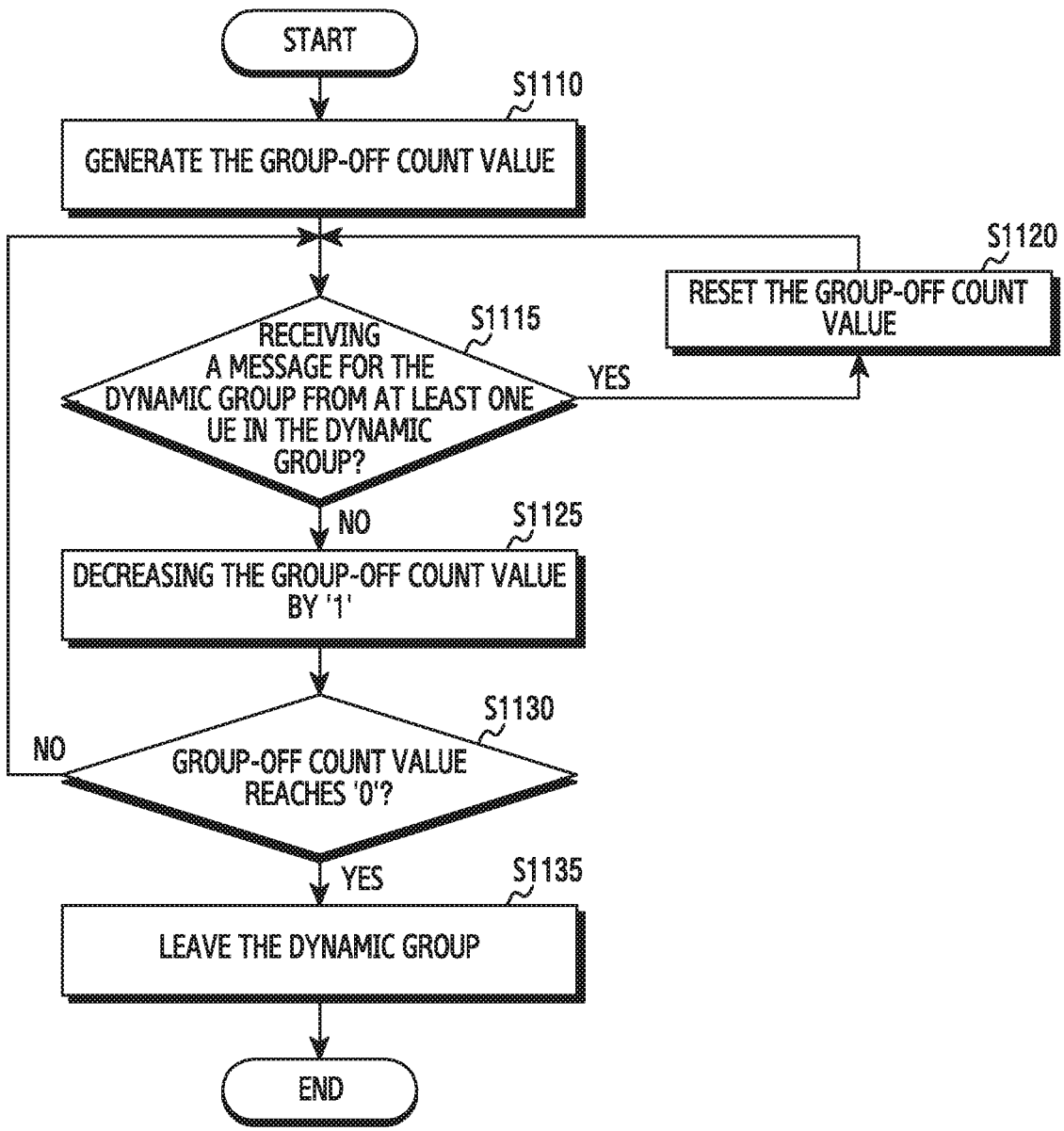
FIG. 11B illustrates operations of a UE that withdraws from a dynamic group according to an embodiment of the present disclosure.

FIG. 11B illustrates operations of a UE that withdraws from a dynamic group according to an embodiment of the present disclosure.

Referring to FIG. 11B, the master UE 1110 creates (or configures) a group-off count value in order to determine whether to withdraw from the dynamic group in operation S1110. For example, the master UE 1110 may generate the group-off count value in order to release the dynamic group when a signal is no longer transmitted or received (or traffic is no longer generated).

In operation S1115, the master UE 1110 identifies whether a message associated with the dynamic group is received from at least one UE in the dynamic group. When the message associated with the dynamic group is received, the master UE 1110 proceeds with operation S1120. Unlike the above, when the message associated with the dynamic group is not received, the master UE 1110 proceeds with operation S1125.

In operation S1120, the master UE 1110 resets the group-off count value. When the master UE 1110 receives the message associated with the dynamic group, it may indicate that the dynamic group needs the master UE 1110. Therefore, the master UE 1110 may reset the group-off count value in order to continuously belong to the dynamic group.

In operation S1125, the master UE 1110 decreases the group-off count value by '1' in order to determine whether to belong to the dynamic group.

In operation S1130, the master UE 1110 identifies whether the group-off count value reaches "0". The operation in operation S1125 may be an operation for determining whether it is meaningful that the master UE 1110 continuously belongs to the dynamic group. "0" may be changed to another value according to settings. When the group-off count value reaches "0", the master UE 1110 proceeds with operation S1135. Unlike the above, when the group-off count value does not reach "0", the master UE 1110 proceeds with operation S1115 again. In other words, when the group-off count value does not reach "0", the master UE 1110 may delay determining whether it is needed that the master UE 1110 belongs to the dynamic group.

In operation S1135, the master UE 1110 withdraws from the dynamic group. The master UE 1110 no longer receives a signal within the dynamic group, and thus, the master UE 1110 may withdraw from the dynamic group.

FIG. 11B illustrates a master UE receiving a message associated with a dynamic group. However, a person skilled in the art may readily draw that the example of FIG. 11B could be applied to a scenario associated with whether the master UE 1110 transmits a message associated with the dynamic group. In addition, a person skilled in the art may readily draw that the example of FIG. 11B could be applied to a scenario associated with whether traffic related to the master UE 1110 is generated within the dynamic group.

Figure 11C:
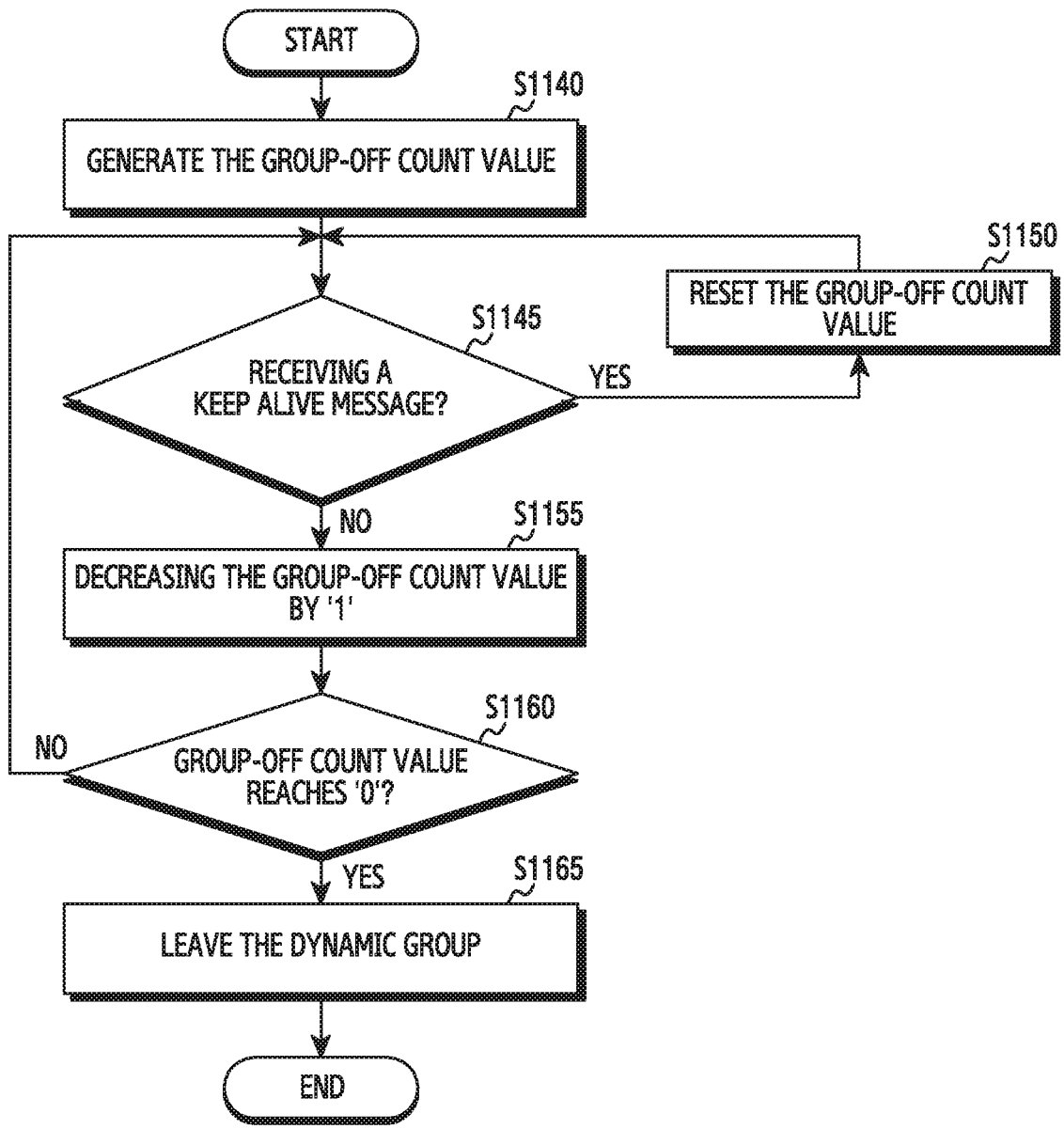
FIG. 11C illustrates operations of a UE that withdraws from a dynamic group according to an embodiment of the present disclosure.

FIG. 11C illustrates operations of a UE that withdraws from a dynamic group according to an embodiment of the present disclosure. The other UE may be the UE 1120 or the UE 1130 of FIG. 11A.

Referring to FIG. 11C, the UE 1120 or the UE 1130 (hereinafter, UE 1120) may create (or configure) a group-off count value in operation S1140.

In operation S1145, the UE 1120 identifies whether a keep alive message is received. The keep alive message may be a message that requests the UE 1120 to belong to the dynamic group. The keep alive message may be transmitted from the master UE 1110, and may be transmitted from other UEs included in the dynamic group. When the keep alive message is received, the UE 1120 proceeds with operation S1150. Unlike the above, when the keep alive message is not received, the UE 1120 proceeds with operation S1155.

In operation S1150, the UE 1120 resets the group-off count value. When the keep alive message is received, it may indicate that it is meaningful that the UE 1120 belongs to the dynamic group. Therefore, the UE 1120 may reset the group-off count value in order to keep on belonging to the dynamic group.

In operation S1155, the UE 1120 decreases the group-off count value by "1". The UE 1120 may decrease the group-off count value by "1" in order to determine whether to belong to the dynamic group.

In operation S1160, the UE 1120 identifies whether the group-off count value reaches "0". When the group-off count value reaches "0", the UE 1120 determines that it is meaningless to belong to the dynamic group and proceeds with operation S1165. Unlike the above, when the group-off count value does not reach "0", the UE 1120 delays determining whether to keep on belonging to the dynamic group, and proceeds with operation S1145 again.

In operation S1165, the UE 1120 withdraws from the dynamic group.

FIG. 11C illustrates a UE receiving a keep alive message. However, a person skilled in the art may readily draw that the example of FIG. 11C could be also applied to the case in which the UE 1120 receives a message associated with the dynamic group, as opposed to the keep alive message. In addition, a person skilled in the art may readily draw that the example of FIG. 11C could be also applied to a scenario associated with whether the UE 1120 transmits a message associated with the dynamic group. In addition, a person skilled in the art may readily draw that the example of FIG. 11C could be also applied to a scenario associated with whether traffic related to the UE 1120 is generated within the dynamic group.

Figure 12:
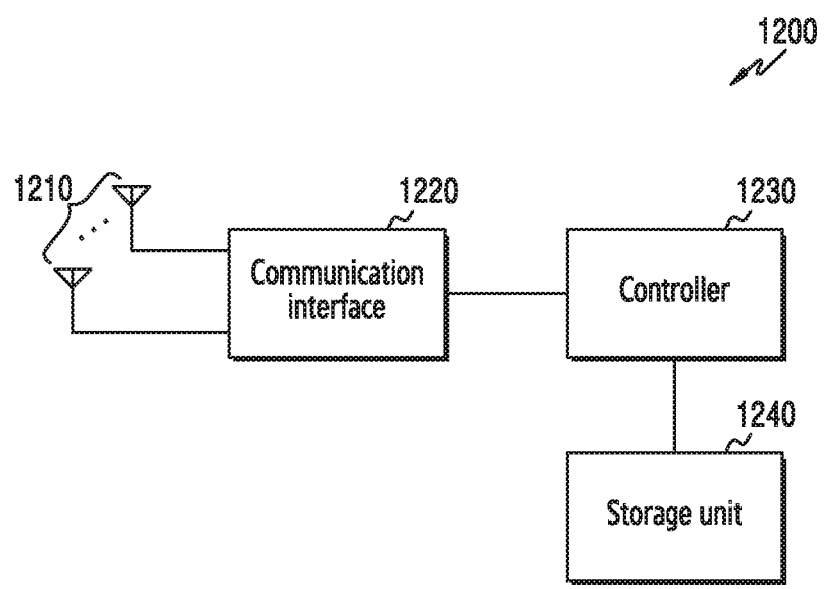
FIG. 12 illustrates a functional configuration of a UE for a dynamic group according to an embodiment of the present disclosure.

FIG. 12 illustrates a functional configuration of a UE for a dynamic group according to an embodiment of the present disclosure. The functional configuration may be included in one of the UEs illustrated in FIGS. 1B, 2, 3, 4, 5A, 5B, 6A, 6B, 6C, 7A, 7B, 7C, 7D, 7E, 7F, 7G, 8A, 8B, 9, 10A, 10B, 11A, 11B, and 11C.

Referring to FIG. 12, a UE 1200 may include an antenna 1210, a communication interface 1220, a controller 1230, and a storage unit 1240. The antenna 1210 may include one or more antennas.

The antenna 1210 may be configured to be appropriate for a multiple input multiple output (MIMO) scheme.

The communication interface 1220 may perform functions for transmitting or receiving a signal through a wireless channel.

The communication interface 1220 may perform a function of converting between a baseband signal and a bit stream according to a physical layer standard of a system. For example, when transmitting data, the communication interface 1220 may generate complex symbols by encoding and modulating a transmission bit stream. As another example, when receiving data, the communication interface 1220 may restore a reception bit stream by decoding and demodulating a base band signal.

The communication interface 1220 may up-convert a base band signal into an RF band signal, and may transmit the same through the antenna 1210. The communication interface 1220 may down-convert, into a base band signal, the RF band signal received through the antenna 1210. For example, the communication interface 1220 may include a transmission filter, a reception filter, an amplifier, a mixer, an oscillator, a digital analog converter (DAC), an analog digital converter (ADC), and the like.

The communication interface 1220 may be operatively coupled with the controller 1230.

The communication interface 1220 may include at least one transceiver.

The controller 1230 may control general operations of the UE 1200. For example, the controller 1230 may transmit or receive a signal through the communication interface 1220. The controller 1230 may record data in the storage unit 1240, and may read data recorded in the storage unit 1240. To this end, the controller 1230 may include at least one processor. For example, the controller 1230 may include a communication processor (CP) that performs a control for communication, and an application processor (AP) that controls a higher layer, such as an application program.

The storage unit 1240 may store a control instruction code for controlling the UE 1200, control data, or user data. For example, the storage unit 1240 may include an application, an operating system (OS), middleware, and a device driver.

The storage unit 1240 may include at least one out of a volatile memory and a non-volatile memory. The volatile memory may include a dynamic random access memory (DRAM), a static RAM (SRAM), a synchronous DRAM (SDRAM), a phase-change RAM (PRAM), a magnetic RAM (MRAM), a resistive RANI (RRAM), ferroelectric RAM (FeRAM), and the like. The non-volatile memory may include a read only memory (ROM), a programmable ROM (PROM), an electrically programmable ROM (EPROM), an electrically erasable ROM (EEPROM), a flash memory, and the like.

The storage unit 1240 may include a non-volatile medium, such as a hard disk drive (HDD), a solid state disk (SSD), an embedded multimedia card (eMMC), and a universal flash storage (UFS).

The storage unit 1240 may be operatively coupled with the controller 1230.

As described above, a method of a UE using D2D communication according to aspects of a wireless environment, the method may include receiving, from each of a plurality of UEs, a response message in response to a request message transmitted from the UE, identifying at least one UE for a dynamic group from among the plurality of UEs based on the response message, and transmitting, to the at least one UE, a group create message including an ID, which is generated for the dynamic group based on an ID of the UE. The ID for the dynamic group may be generated by including time information associated with a time the ID for the dynamic group is generated.

According to some embodiments of the present disclosure, the response message may include an ID of each of the plurality of UEs, and the ID for the dynamic group is generated by including the ID of each of the plurality of UEs. For example, the response message may include an ID of each of the plurality of UEs and information associated with a distance between the UE and each of the plurality of UEs, and the operation of identifying the at least one UE includes identifying the at least one UE of which the distance is less than or equal to a designated value from among the plurality of UEs. As another example, the request message may include time information associated with a time the request message is transmitted, and the distance may be determined based on the time information and time information associated with a time each of the plurality of UEs receives the request message.

According to some other embodiments of the present disclosure, the method may further include communicating with the at least one UE using the ID for the dynamic group.

According to some other embodiments of the present disclosure, the request message may be transmitted from the UE so as to request information for generating the dynamic group, and the response message may include state information associated with each of the plurality of UEs. For example, the state information associated with each of the plurality of UEs may include at least one out of power state information of each of the plurality of UEs, user state information of each of the plurality of UEs, and information associated with a distance between each of the plurality of UEs and the UE.

According to some other embodiments of the present disclosure, the ID of the UE may be a prose UE ID associated with the UE.

According to some other embodiments of the present disclosure, the method further includes transmitting a message for maintaining the dynamic group to each of the at least one UE.

As described above, an apparatus of a UE using D2D communication according to aspects of a wireless environment, the apparatus including at least one processor, and at least one transceiver configured to be operatively coupled to the at least one processor, wherein the at least one processor is configured to receive a response message from each of a plurality of UEs in response to a request message transmitted from the UE, identify at least one UE for a dynamic group from among the plurality of UEs based on the response message, generate an identifier (ID) for the dynamic group based on an ID of the UE, and transmit, to the at least one UE, a group create message including the ID for the dynamic group.

According to some embodiments of the present disclosure, the ID for the dynamic group may be generated by including time information associated with a time the ID for the dynamic group is generated.

According to some embodiments of the present disclosure, the response message may include an ID of each of the plurality of UEs, and the ID for the dynamic group may be generated by including an ID of each of the plurality of UEs.

According to some other embodiments of the present disclosure, the response message may include an ID of each of the plurality of UEs and information associated with a distance between each of the plurality of UEs and the UE, and the controller may be configured to identify the at least one UE of which the distance is less than or equal to a designated value, from among the plurality of UEs. For example, the request message may include time information associated with a time the request message is transmitted, and the distance may be determined based on the time information and time information associated with a time each of the plurality of UEs receives the request message.

According to some other embodiments of the present disclosure, the controller may be further configured to communicate with the at least one UE using the ID for the dynamic group.

According to some other embodiments of the present disclosure, the request message may be transmitted from the UE to request information for generating the dynamic group, and the response message may include state information associated with each of the plurality of UEs. For example, the state information associated with each of the plurality of UEs may include at least one out of power state information of each of the plurality of UEs, user state information of each of the plurality of UEs, and information associated with a distance between each of the plurality of UEs and the UE.

According to some other embodiments of the present disclosure, the ID of the UE is a prose UE ID associated with the UE.

As described above, an apparatus of a UE using D2D communication according to aspects of a wireless environment includes a and at least one transceiver configured to be operatively coupled to the at least one processor, wherein the at least one processor is configured to transmit a response message of the UE to a master UE in response to receiving a request message from the master UE, and receive, from the master UE, a group create message including an ID for a dynamic group, which is generated based on an ID of the master UE.

Methods stated in claims and/or specifications according to various embodiments may be implemented by hardware, software, or a combination of hardware and software.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

The programs (software modules or software) may be stored in non-volatile memories including a random access memory and a flash memory, a ROM, an electrically erasable programmable ROM (EEPROM), a magnetic disc storage device, a compact disc-ROM (CD-ROM), digital versatile disks (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which may access the electronic device through communication networks, such as the Internet, Intranet, local area network (LAN), wide LAN (WLAN), and storage area network (SAN) or a combination thereof. Such a storage device may access the electronic device via an external port. Further, a separate storage device on the communication network may access a portable electronic device.

In the above-described embodiments of the present disclosure, a component included in the present disclosure is expressed in the singular or the plural according to a presented embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for operating a first user equipment (UE) in a wireless communication system, the method comprising:
    receiving, from a server, information regarding an identifier (ID) of a dynamic group, that is assigned by the server;
    broadcasting, to unspecified UEs in a proximity area from the first UE, the information regarding the ID of the dynamic group; and
    communicating based on the dynamic group with a second UE which received the broadcasted information, wherein the second UE is in the proximity area from the first UE,
    wherein the ID of the dynamic group is based on a layer-2,
    wherein the ID of the dynamic group is generated based on an ID of at least one of the first UE or the second UE, and
    wherein the ID of the at least one of the first UE or the second UE comprises a prose UE ID associated with the at least one of the first UE or the second UE.

2. The method of claim 1, wherein the ID of the dynamic group includes time information associated with a time the ID of the dynamic group is generated.

3. The method of claim 1, further comprising:
    transmitting a request message to request information for generating the dynamic group; and
    receiving a response message including state information associated with the second UE.

4. The method of claim 3, wherein the state information associated with the second UE includes at least one of:
    power state information of the second UE,
    user state information of the second UE, or
    information associated with a distance between the second UE and the first UE.

5. The method of claim 1, further comprising:
    transmitting a message for maintaining the dynamic group to the second UE.

6. The method of claim 1, The method of claim 1, wherein the ID of the dynamic group is associated with a prose layer-2 ID.

7. An apparatus for operating a first user equipment (UE) in a wireless communication system, the apparatus comprising:
    a transceiver; and
    at least one processor operatively coupled to the transceiver,
    wherein the at least one processor is configured to:
        receive, from a server, information regarding an identifier (ID) of a dynamic group, that is assigned by the server,
        broadcast, to unspecified UEs in a proximity area from the first UE, the information regarding the ID of the dynamic group, and
        communicate based on the dynamic group with a second UE which received the broadcasted information, wherein the second UE is in the proximity area from the first UE,
    wherein the ID of the dynamic group is based on a layer-2,
    wherein the ID of the dynamic group is generated based on an ID of at least one of the first UE or the second UE, and
    wherein the ID of the at least one of the first UE or the second UE comprises a prose UE ID associated with the at least one of the first UE or the second UE.

8. The apparatus of claim 7, wherein the ID of the dynamic group includes time information associated with a time the ID of the dynamic group is generated.

9. The apparatus of claim 7, wherein the at least one processor is further configured to:
    control the transceiver to transmit a request message to request information for generating the dynamic group, and
    control the transceiver to receive a response message including state information associated with the second UE.

10. The apparatus of claim 9, wherein the state information associated the second UE includes at least one of:
    power state information of the second UE,
    user state information of the second UE, or
    information associated with a distance between the second UE and the first UE.

11. The apparatus of claim 7, wherein the at least one processor is further configured to broadcast the information regarding the ID of the dynamic group.

12. An apparatus for a first user equipment (UE) in a wireless communication system, the apparatus comprising:

a transceiver; and at least one processor operatively coupled to the transceiver, wherein the at least one processor is configured to:
receive broadcasted information regarding an identifier (ID) of a dynamic group, that is assigned by a server, wherein the broadcasted information is broadcasted from a second UE to unspecified UEs in a proximity area from the second UE, wherein the first UE is in the proximity area from the second UE,
perform a procedure for joining the dynamic group, and
communicate with the second UE based on the dynamic group, wherein the ID of the dynamic group is based on a layer-2;

wherein the ID of the dynamic group is generated based on an ID of at least one of the first UE or the second UE, and wherein the ID of the at least one of the first UE or the second UE comprises a prose UE ID associated with the at least one of the first UE or the second UE.

13. The apparatus of claim 12, wherein the ID of the dynamic group is transmitted from the server.

* * * * *